(12) United States Patent
Kemp et al.

(10) Patent No.: US 10,968,894 B2
(45) Date of Patent: Apr. 6, 2021

(54) WIND TURBINE FOUNDATION AND METHOD OF CONSTRUCTING A WIND TURBINE FOUNDATION

(71) Applicant: Tetra Tech, Inc., Pasadena, CA (US)

(72) Inventors: Paul Kemp, Calgary (CA); Cory Williams, Torbay (CA)

(73) Assignee: TETRA TECH, INC., Pasadena, CA (US)

( * ) Notice: Subject to any disclaimer, the term of this patent is extended or adjusted under 35 U.S.C. 154(b) by 0 days.

(21) Appl. No.: 16/880,259

(22) Filed: May 21, 2020

(65) Prior Publication Data

US 2020/0284241 A1    Sep. 10, 2020

Related U.S. Application Data

(62) Division of application No. 16/591,720, filed on Oct. 3, 2019.

(60) Provisional application No. 62/874,029, filed on Jul. 15, 2019, provisional application No. 62/741,184, filed on Oct. 4, 2018.

(51) Int. Cl.
*E04H 12/08* (2006.01)
*F03D 13/20* (2016.01)
*E02D 27/42* (2006.01)

(52) U.S. Cl.
CPC .......... *F03D 13/22* (2016.05); *E02D 27/425* (2013.01); *E04H 12/08* (2013.01); *F05B 2230/60* (2013.01); *F05B 2240/912* (2013.01)

(58) Field of Classification Search
CPC combination set(s) only.
See application file for complete search history.

(56) References Cited

U.S. PATENT DOCUMENTS

| | | |
|---|---|---|
| 4,714,225 A | 12/1987 | Skinner |
| 5,586,417 A | 12/1996 | Henderson et al. |
| 7,618,217 B2 | 11/2009 | Henderson |
| 7,895,744 B2 | 3/2011 | Numajiri |
| 8,322,093 B2 | 12/2012 | Zavitz |
| 8,359,798 B2 | 1/2013 | Armbrecht |
| 8,458,970 B2 | 6/2013 | Zavitz et al. |
| 8,471,396 B2 | 6/2013 | Roddier |
| 8,516,774 B2 | 8/2013 | Zavitz |

(Continued)

FOREIGN PATENT DOCUMENTS

| | | |
|---|---|---|
| CA | 2049181 | 5/1995 |
| CA | 2663935 | 3/2008 |

(Continued)

OTHER PUBLICATIONS

WIPO "Invitation to Pay Additional Fees and, Where Applicable, Protest Fee" dated Nov. 26, 2019.

(Continued)

*Primary Examiner* — Kyle Armstrong
(74) *Attorney, Agent, or Firm* — Robinson IP Law, PLLC

(57) ABSTRACT

A wind turbine foundation and method for making a wind turbine foundation. The wind turbine foundation preferably includes a core member including a substantially cylindrically-shaped main body, a first outer flange extending out from the main body along an upper section of the core member, and a second outer flange extending out from the main body along a lower section of the core member, and a plurality of radial girders connected to the first outer flange and the second outer flange and radiating out from the core member.

18 Claims, 33 Drawing Sheets

(56) References Cited

U.S. PATENT DOCUMENTS

| | | |
|---|---|---|
| 8,661,752 B2 | 3/2014 | Phuly |
| 8,695,297 B2 | 4/2014 | Knisel |
| 8,733,045 B2 | 5/2014 | Zavitz |
| 8,833,004 B2 | 9/2014 | Prass |
| 8,912,679 B2 | 12/2014 | Rodway |
| 9,096,985 B1 | 8/2015 | Phuly |
| 9,347,197 B2 | 5/2016 | Phuly |
| 9,446,822 B2 | 9/2016 | Roddier |
| 9,518,402 B1 | 12/2016 | Kundel, Sr. |
| 9,534,405 B1 | 1/2017 | Phuly |
| 9,810,204 B2 | 11/2017 | Aubault et al. |
| 9,937,635 B2 | 4/2018 | Phuly |
| 9,938,685 B2 | 4/2018 | Krause |
| 2007/0181767 A1 | 8/2007 | Wobben |
| 2008/0072511 A1 | 3/2008 | Phuly |
| 2009/0217607 A1 | 9/2009 | Stark |
| 2010/0257794 A1 | 10/2010 | Stark |
| 2011/0061321 A1 | 3/2011 | Phuly |
| 2012/0068039 A1 | 3/2012 | Erich |
| 2012/0167499 A1 | 7/2012 | Knisel |
| 2012/0266796 A1 | 10/2012 | Roodenburg et al. |
| 2013/0227898 A1 | 9/2013 | Fairbairn |
| 2013/0326970 A1 | 12/2013 | Prass |
| 2014/0033628 A1 | 2/2014 | Lockwood et al. |
| 2014/0115978 A1 | 5/2014 | Fairbairn |
| 2014/0237908 A1 | 8/2014 | Gupta |
| 2014/0260023 A1 | 9/2014 | Henderson |
| 2016/0160843 A1 | 6/2016 | Jensen |
| 2018/0051677 A1 | 2/2018 | Aubault et al. |
| 2018/0073487 A1 | 3/2018 | Beramendi Ortega et al. |
| 2018/0264680 A1 | 9/2018 | Phuly |
| 2019/0084183 A1 | 3/2019 | Phuly |

FOREIGN PATENT DOCUMENTS

| | | |
|---|---|---|
| CA | 2666553 A1 | 12/2008 |
| CA | 2719694 C | 10/2009 |
| CA | 2666553 C | 3/2012 |
| CN | 105133677 | 12/2016 |
| EP | 2064393 A2 | 6/2009 |
| EP | 2064393 A4 | 12/2009 |
| EP | 2427603 A2 | 3/2012 |
| EP | 2064393 B1 | 7/2012 |
| EP | 2913522 | 9/2015 |
| EP | 2427603 A4 | 9/2016 |
| EP | 2427603 B1 | 3/2018 |
| WO | 2008036934 A2 | 3/2008 |
| WO | 2008036934 A3 | 6/2008 |
| WO | 2008036934 A9 | 8/2008 |
| WO | 2010138978 A2 | 12/2010 |
| WO | 2010138978 A3 | 1/2011 |
| WO | 2011095729 | 8/2011 |
| WO | 2015061862 | 5/2015 |

OTHER PUBLICATIONS

Smith, Carlie, "Boralex Moose Lake Wind Project" presentation (2017).

Judd, Elizabeth, Energy and Mines, "Raglan Mine: Canada's First Industrial-Scale Wind and Energy Storage Facility".

International Search Report and Written Opinion of the International Searching Authority, PCT Patent App. No. PCT/US19/54384, dated Mar. 9, 2020.

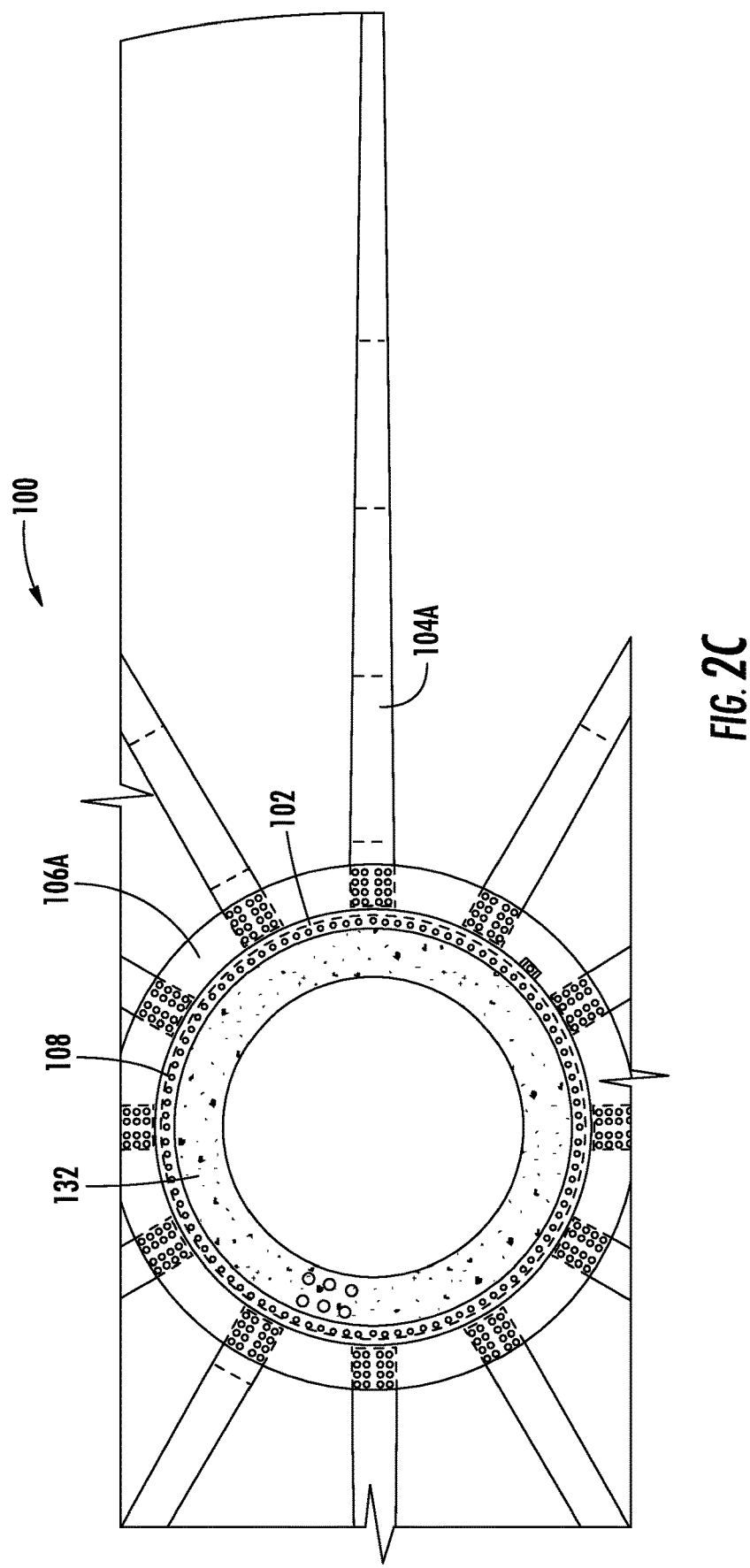

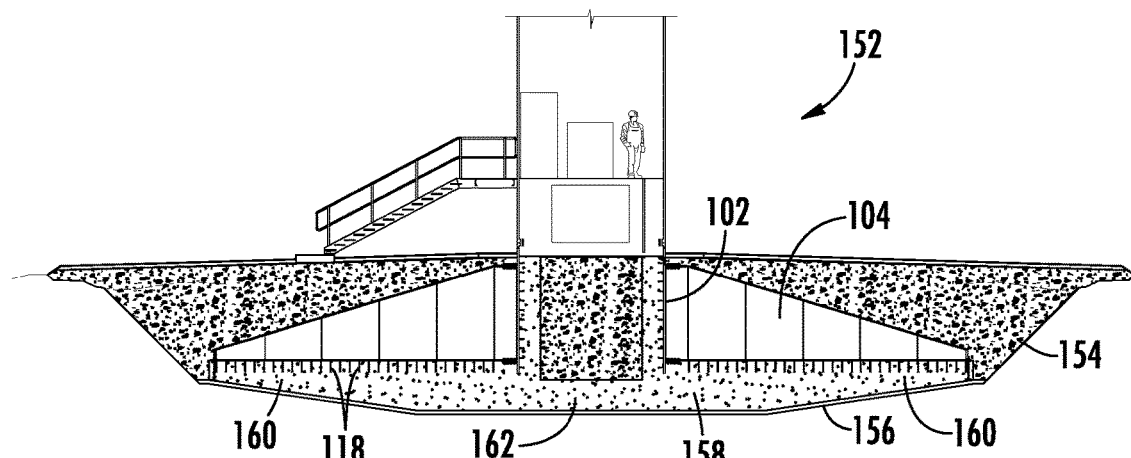

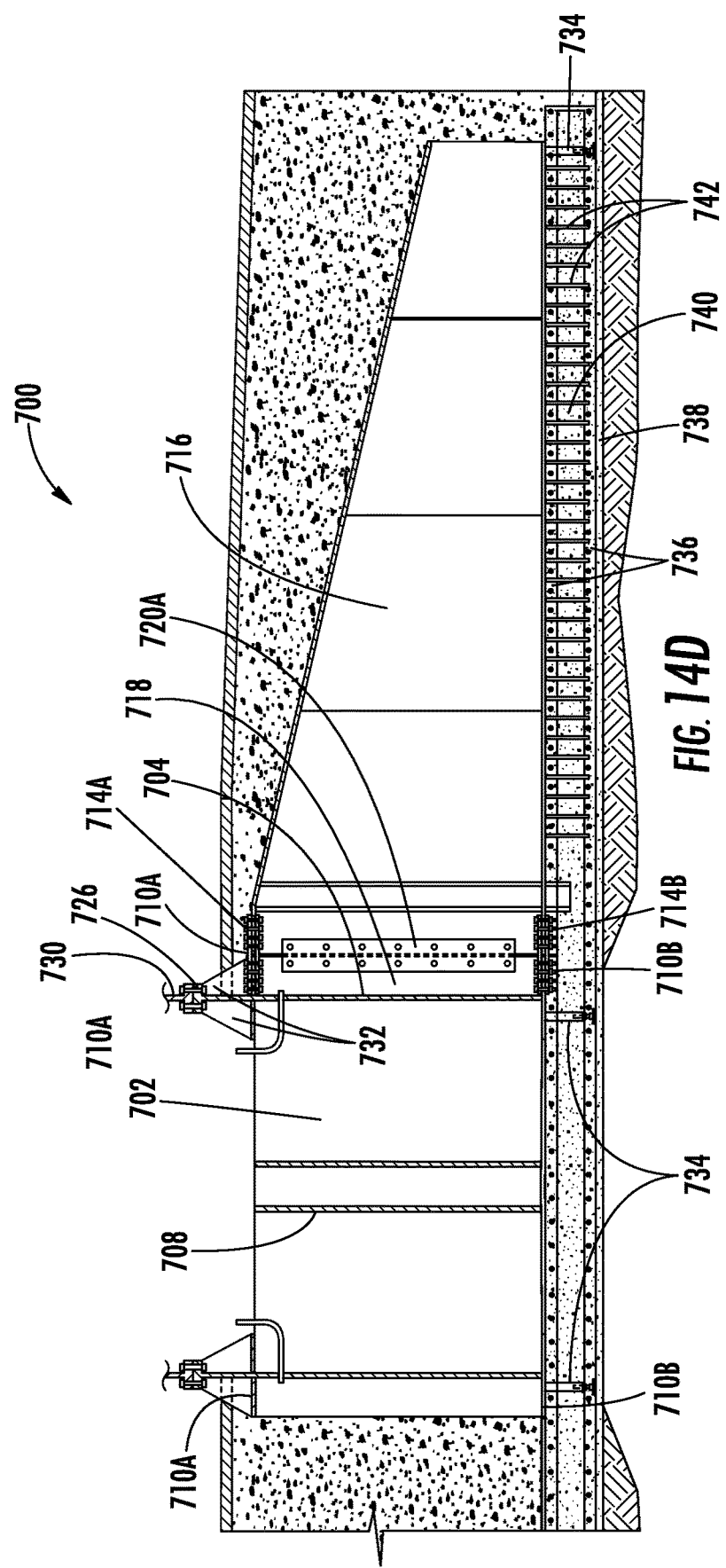

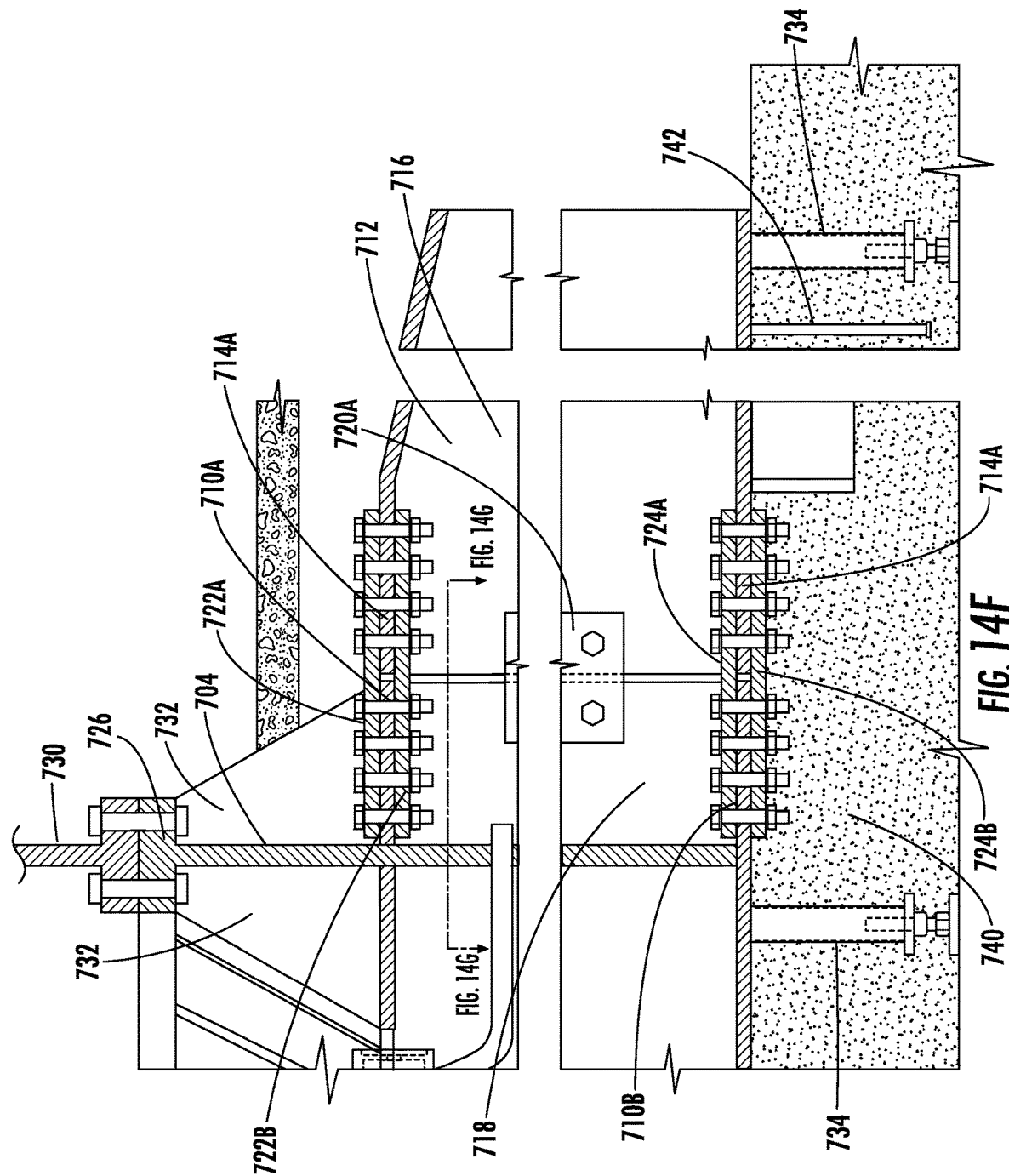

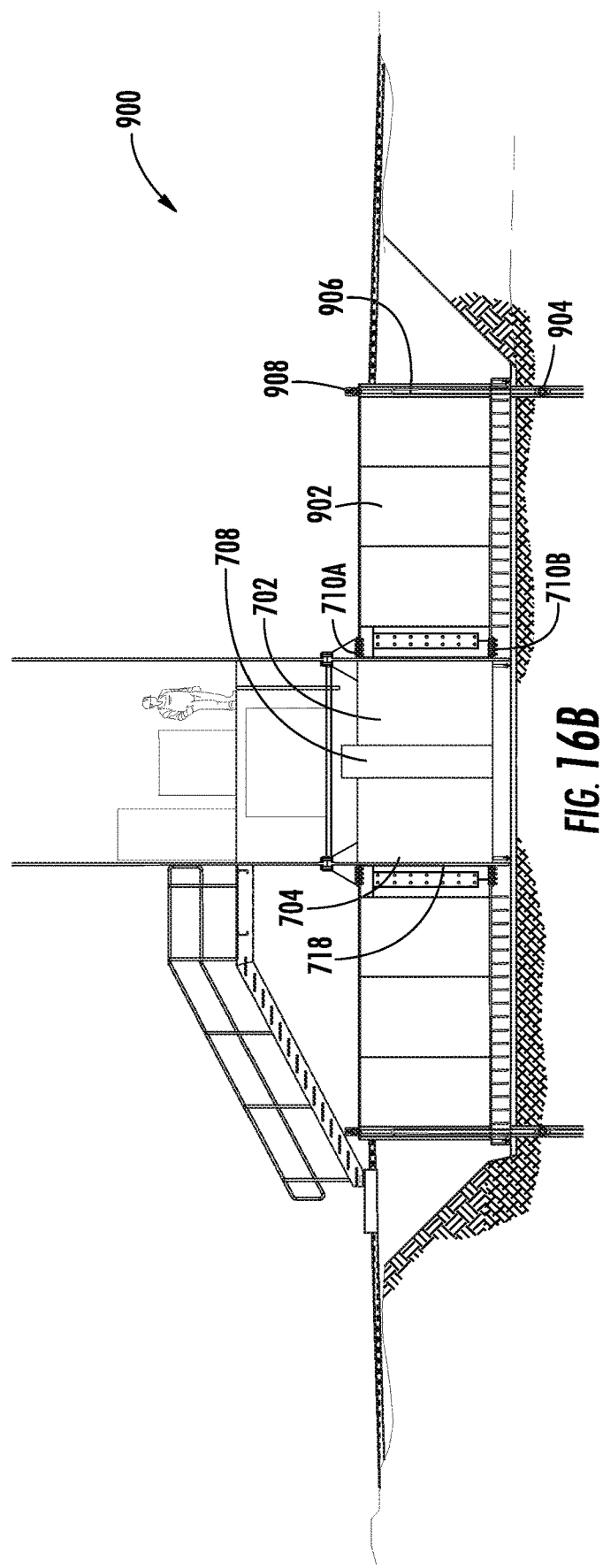

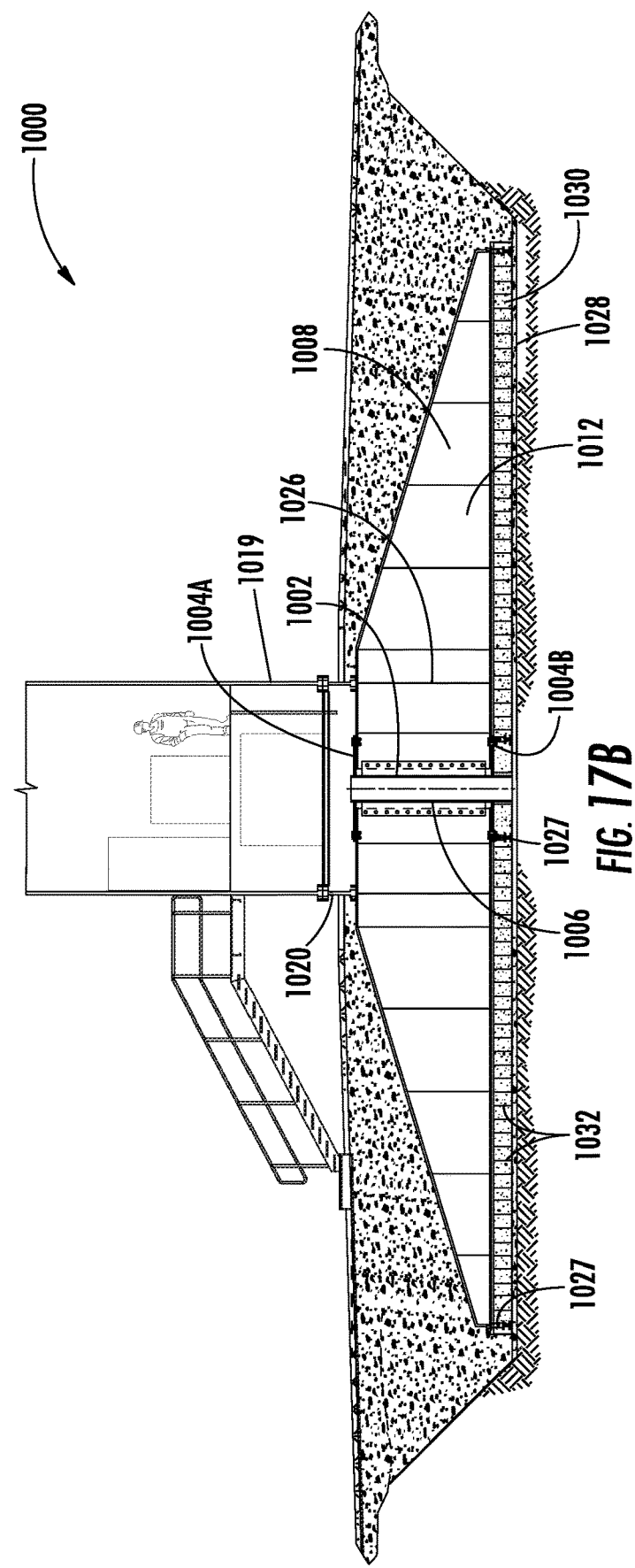

WIND TURBINE FOUNDATION AND METHOD OF CONSTRUCTING A WIND TURBINE FOUNDATION

CROSS-REFERENCE(S) TO RELATED APPLICATION(S)

This application claims priority to pending U.S. Nonprovisional patent application Ser. No. 16/591,720 entitled "Wind Turbine Foundation and Method of Constructing a Wind Turbine Foundation" filed on Oct. 3, 2019 which claims priority to Provisional Patent Application No. 62/741,184 entitled "Wind Turbine Foundation" filed on Oct. 4, 2018 and U.S. Provisional Patent Application No. 62/874,029 entitled "WK Wind Turbine Foundation" filed on Jul. 15, 2019, all of which are incorporated herein by reference in their respective entireties.

FIELD

This disclosure relates to the field of construction related to wind turbines or other tower-like structures. More particularly, this disclosure relates to a foundation for a wind turbine.

BACKGROUND

The wind energy generation market has experienced tremendous growth over the past decade with wind energy currently recognized as the lowest cost source of renewable energy generation. The key driver of this growth has been the advancements made in wind turbine technologies, with wind turbines growing in capacity, size and height every year. The advancements in wind turbine technologies has placed increasing strains on the other classical approaches to wind project design and construction, and as a result several of the classical, brute force approaches to wind project design and construction are reaching their limits of effectiveness and cost efficiency. Change in wind project design and construction is required to complement the turbine technology changes being experienced in the industry.

In 2018 US wind energy generation capacity grew by over 8%, and the installed capacity of wind generation is anticipated to exceed that of hydro by the end of 2020. This growth has been driven by the reductions in cost of the wind generation technologies. The key driver of these reductions in cost have been the advancements in wind turbine technologies. Wind turbines have grown consistently in the past few years with turbine size, weight and tower heights increasing significantly every year. In 2018 the largest turbines installed in North America had capacities on the order of 3.6 MW, with tower heights of 110 m. In 2020 wind turbine installations will include 4.8 MW turbines with tower heights exceeding 140 m.

While turbine sizes are growing every year, turbine logistics remain constrained with road, rail and truck transport limiting tower base dimensions. These increases in turbine size combined with limit on growth of the tower base dimensions has resulted in significant growth in the load demands being placed on the wind turbine foundations. In contrast to the technology improvements seen on the turbines, wind turbine foundation technologies have not advanced significantly over the past 20 years. Today's predominant wind turbine foundations are the traditional concrete raft foundation, with minor variations being applicable for unique ground conditions (shallow bedrock situations, etc.). While the concrete raft foundation was a good solution for the turbines installed in 2016, with capacities of 2.6 MW and tower heights of 70 m, they are now approaching their limits of applicability. Increasing the size and strength of the concrete raft foundation is not a simple matter, with rebar and anchor bolt cage densities reaching the limits of constructability, the complexities of very large concrete pours creating significant logistics issues and quality risks. What is needed therefore are new approaches to wind turbine foundations to meet the needs of the continuing advancements in wind turbine technologies.

SUMMARY

The above and other needs are met by a wind turbine foundation comprising a core member which may include, for example, a metal base can or a metal spool. In some embodiments wherein the core member comprises a metal base can, the metal base can further comprises a substantially cylindrically-shaped main body, a first outer flange extending out from the main body along an upper section of the base can, a second outer flange extending out from the main body along a lower section of the base can, and a tower flange including a plurality of apertures for attaching a wind turbine tower to the base can; and a plurality of metal radial girders connected to and radiating out from the base can wherein each of the plurality of radial girders are connected to the first outer flange and the second outer flange. Preferably, the wind turbine foundation of claim 1 wherein the wind turbine foundation is located in an excavated hole in the ground, wherein the hole in the ground is created by removing soil, and wherein at least some of the removed soil is laid over at least a portion of the plurality of metal girders. The wind turbine foundation preferably further includes an underlying slab and a layer of rebar located above the underlying slab. The wind turbine foundation preferably further includes a base layer of concrete poured along the underlying slab and the layer of rebar.

In some embodiments, the plurality of radial girders includes an upper girder flange and a lower girder flange wherein each upper girder flange is connected to the first outer flange and each lower girder flange is connected to the second outer flange.

In some embodiments, the wind turbine foundation includes an inner shell of concrete lining an inside surface of the base can. In similar embodiments, the wind turbine foundation may further include concrete substantially filling the base can.

In some embodiments, the wind turbine foundation includes a reinforced concrete base slab supporting the metal base can and the plurality of radial girders, wherein the excavation under the slab is tapered so that a bottom side of the slab filling the excavation is tapered and bulges along a middle portion of the base slab.

In some embodiments, the wind turbine foundation includes a reinforced concrete base slab wherein the excavation under the slab is in a stepped configuration so that a bottom side of the slab filling the excavation is in a stepped configuration.

In some embodiments, the wind turbine foundation includes a plurality of first transverse girders wherein individual members of the plurality of first transverse girders are located between and connected to pairs of the plurality of radial girders. The wind turbine foundation may further include a plurality of second transverse girders wherein individual members of the plurality of second transverse girders are located between and connected to pairs of the plurality of girders at distal ends of the radial girders.

In some embodiments, the wind turbine foundation includes a perimeter grade beam of concrete and a mid-grade beam of concrete beneath a reinforced concrete base slab.

In some embodiments, at least a first portion of the upper girder flanges are substantially parallel with a portion of the lower girder flanges. In some embodiments, the first portion of the upper girder flanges comprises most of the upper girder flanges.

In some embodiments the plurality of radial girders comprises a plurality of truss girders.

In some embodiments the wind turbine foundation includes a plurality of piles supporting the plurality of radial girders at distal ends of the plurality of radial girders.

In some embodiments the wind turbine foundation further includes a core column inside the base can and a plurality of stiffener plates connected to and radiating out from the core column wherein distal edges of the stiffener plates are connected to an interior surface of the base can. The wind turbine foundation may further include a first plurality of rock anchors connected to the plurality of radial girders wherein there is at least one rock anchor per radial girder extending into bedrock. The wind turbine foundation may further include a plurality of transverse girders wherein individual members of the plurality of transverse girders are located between and connected to pairs of the plurality of radial girders. The wind turbine foundation may further include a second plurality of rock anchors connected to the plurality of transverse girders wherein there is at least one rock anchor per transverse girder extending into bedrock. In some embodiments the base can further comprises a plurality of vertical flanges wherein individual vertical flanges of the plurality of vertical flanges are connected to individual radial girders of the plurality of radial girders.

In some embodiments the wind turbine foundation includes a plurality of vertically oriented beams connected to an interior surface of the base can to stiffen the base can.

In another aspect, a wind turbine foundation is disclosed comprising a metal spool; a plurality of metal radial girders connected to and radiating out from the metal spool; and a ring girder connected above the plurality of radial girders wherein the ring girder further comprises a tower flange including a plurality of apertures for attaching a wind turbine tower to the ring girder. The ring girder may further include a composite ring girder comprising a plurality of ring girder sections forming the composite ring girder wherein ring girder sections are individually connected to the plurality of radial girders with one ring girder section per radial girder. The spool may further include a substantially cylindrically-shaped main body, a first outer flange extending out from the main body along an upper section of the spool, and a second outer flange extending out from the main body along a lower section of the spool wherein each of the plurality of radial girders are connected to the first outer flange and the second outer flange. The spool may further include a plurality of vertical flanges wherein individual vertical flanges of the plurality of vertical flanges are connected to individual radial girders of the plurality of radial girders. The spool may further include a plurality of pairs of vertical flanges located in an area between the first outer flange and the second outer flange wherein individual pairs of vertical flanges of the plurality of pairs of vertical flanges are connected to individual radial girders of the plurality of radial girders.

In another aspect, a method of erecting a wind turbine foundation is disclosed, the method comprising the steps of excavating a foundation area in the ground by removing excavated soil from the ground; pouring a mud slab in the excavated foundation area to create a level work surface; placing a metal core member in the excavated foundation area; and attaching a plurality of metal radial girders to the core member. The core member may include, for example, a metal base can or a metal spool. The core member preferably includes a substantially cylindrically-shaped main body, a first outer flange extending out from the main body along an upper section of the core member, and a second outer flange extending out from the main body along a lower section of the core member wherein each of the plurality of radial girders are connected to the first outer flange and the second outer flange.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 2C shows a partial plan view of the wind turbine foundation shown in FIG. 2.

FIG. 6 shows a side view of a wind turbine foundation including a tapered mud slab and base layer;

FIG. 7 shows a side view of a wind turbine foundation including a tapered stepped mud slab and base layer;

FIG. 14D shows a partial side view of the wind turbine foundation shown in FIGS. 14A-14C including a girder attached to the right side of the base can and, for illustrative purposes to better show features of the base can, with no girder shown attached to the left side of the base can;

FIG. 14F shows a segmented partial side view of the wind turbine foundation shown in FIGS. 14A-14D wherein the image is cut and truncated both horizontally and vertically to show the top and bottom corners of one side of the wind turbine foundation;

FIG. 16B shows a side view of the wind turbine foundation shown in FIG. 16A;

FIG. 17B shows a side view the wind turbine foundation shown in FIG. 17A with a first tower piece added;

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Figure 1:
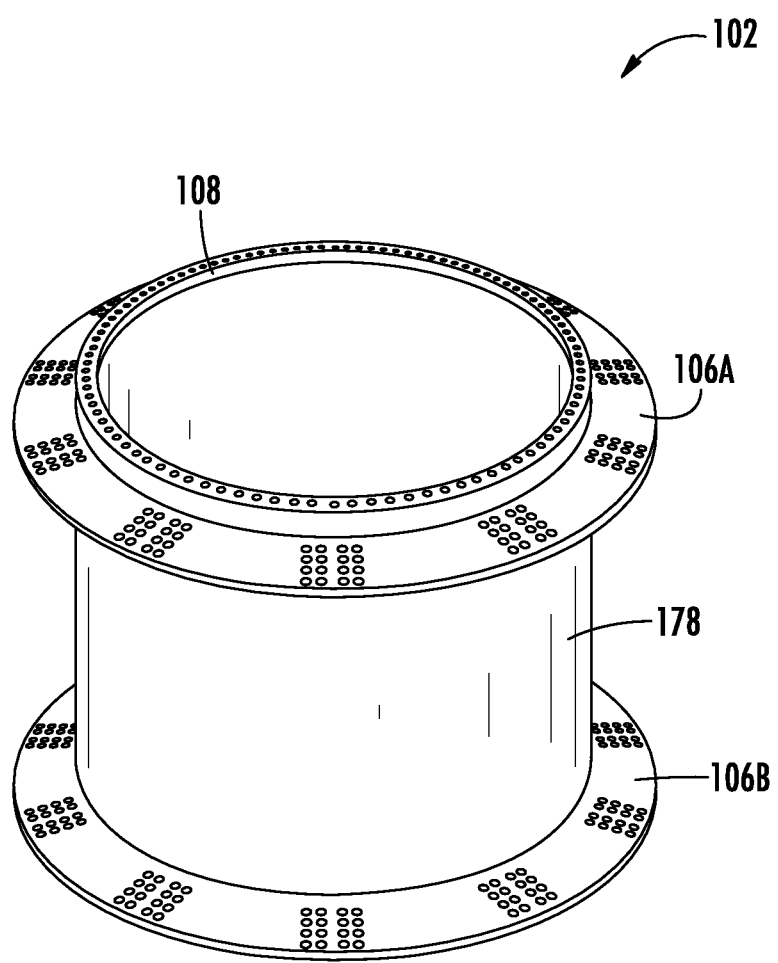
FIG. 1 shows a perspective view of an embodiment of a base can used in the construction of wind turbine foundations described herein.

An example of a wind turbine foundation 100 and its components is shown in FIGS. 1, 2, 2A, 2B, 2C, 2D, 3A and 3B. FIG. 1 shows a base can 102—a central component of the wind turbine foundation 100 shown more completely in the plan view of FIG. 3A and a side view of FIG. 3B. The base can 102, which comprises a metal shell, is referred to as a "can" because of its preferred cylindrical shape which looks like a traditional can as well as its preferred composition (i.e., including mostly or completely metal or metal alloy, hereinafter collectively referred to as "metal"). A rounded cylindrically-shaped base can is preferred but other shapes would work including a polygonal base can with multiple faces. A plurality of radial girders 104 are connected to the base can 102. The base can 102 preferably includes a first outer flange 106A and a second outer flange 106B. The plurality of girders 104 are preferably connected to the base can 102 by bolting the girders 104 to the first outer flange 106A and the second outer flange 106B. Although bolting is specifically described in this example, other devices and/or methods of attachment may be used such as, for example, welding.

The plurality of girders 104 preferably includes twelve substantially similar girders of the same size and shape. In other examples, the plurality of girders 104 can include more than twelve or fewer than twelve girders. The girders 104 and other similar objects described herein are preferably made of steel but other metals or metal alloys could be used instead of or in addition to steel. The girders 104 are preferably made using traditional steel plate girder design used in bridge girders and existing steel bridge design codes and associated manufacturing methods. Each of the girders 104 is preferably tapered as shown and preferably has a length ranging from about 8 meters (m) to about 14 m and a height at the highest point ranging from about 2.5 m to about 5 m.

Figure 2:
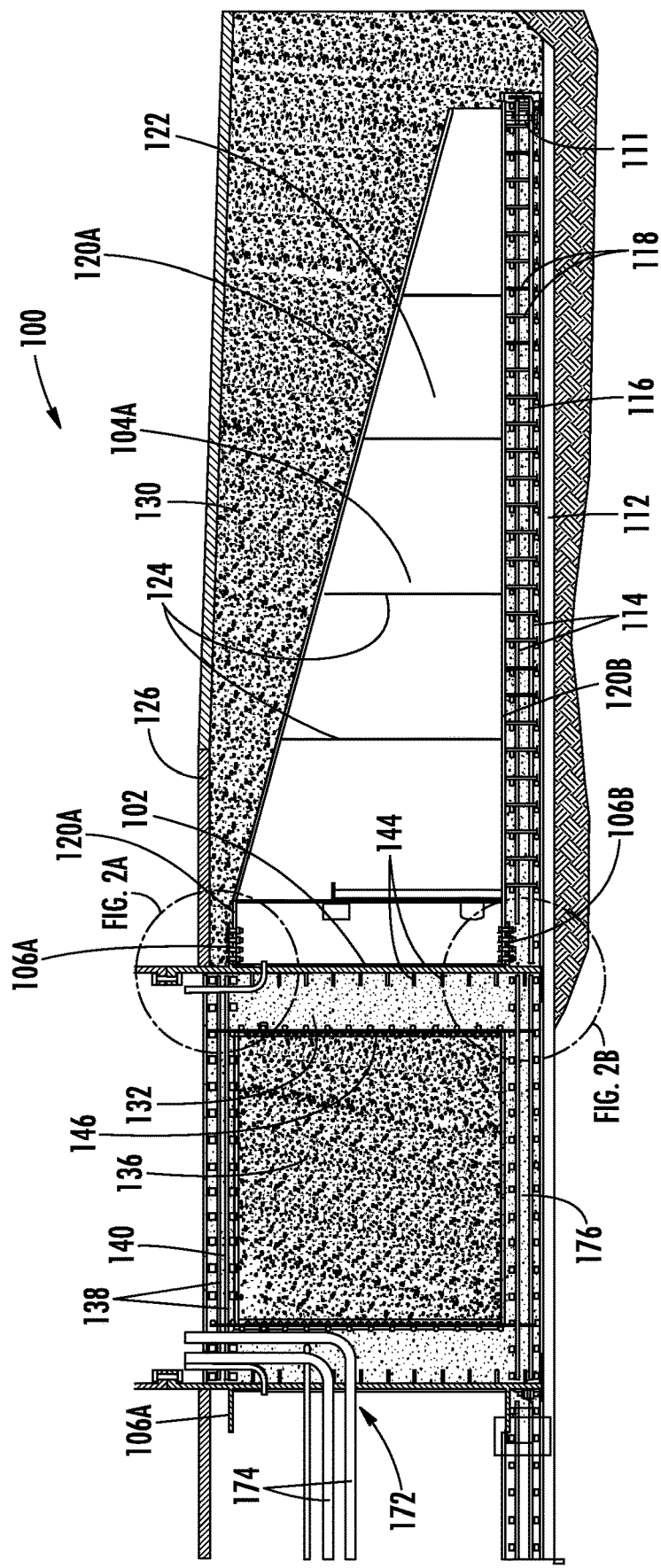
FIG. 2 shows a cutaway partial side view of a portion of a wind turbine foundation showing a girder attached to the right side of the base can shown in FIG. 1 and, for illustrative purposes to better show features of the base can, with no girder shown attached to the left side of the base can.
Figure 2A:
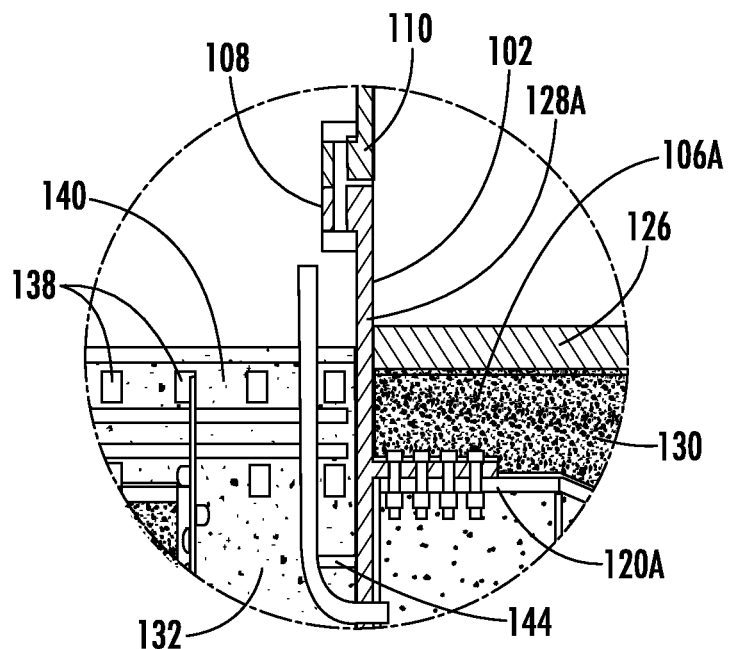
FIG. 2A shows a close-up view of a first highlighted section of the wind turbine foundation shown in FIG. 2.
Figure 2B:
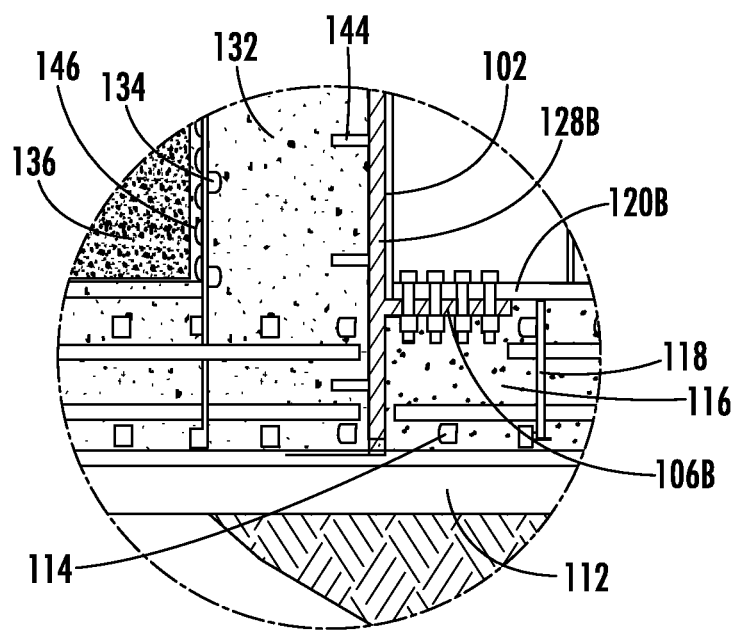
FIG. 2B shows a close-up view of a second highlighted section the wind turbine foundation shown in FIG. 2

FIG. 2 shows a closer view of the base can 102 connected to a first girder 104A. A first close-up view of the connection between the first outer flange 106A and the first girder 104A is highlighted and shown in FIG. 2A. A second close-up view of the connection between the second outer flange 106B and the first girder 104A is also highlighted and shown in FIG. 2B. A plan view of the connections between the base can 102 and the plurality of girders 104 is shown in FIG. 2C. The base can 102 also preferably includes a tower flange 108 for attaching a first tower piece 110 to the base can 102. A close-up view of a preferred connection between the tower flange 108 and the first tower piece 110 is highlighted and shown in FIG. 2A showing a preferred embodiment using bolts on the inside of the base can 102 and the first tower piece 110 but not on the outside. Other embodiments may include a two-sided tower flange for using both internal and external bolting to hold the base can 102 to the first tower piece 110. Use of only internal bolts and only an inward facing tower flange is preferred because the mechanical connection is protected from the elements, thereby reducing corrosion or other deterioration of the connection between the base can 102 and the first tower piece 110. The base can 102 preferably has a diameter that substantially matches the diameter of the first tower piece 110. The wall thickness of the base can is preferably at least as thick as the wall thickness of the first tower piece 110.

The wind turbine foundation 100 preferably includes a mud slab 112 on which the base can 102 rests. The mud slab preferably comprises concrete with a level top surface and is preferably about 100 millimeters (mm) to 150 mm thick in some embodiments. Rebar 114 and a base slab layer 116 (preferably made of concrete) is preferably located above the mud slab 112 inside and outside of the base can 102. The base slab layer 116 (or "base slab" or "base layer") is designed at a nominal thickness that is much less than the mass concrete of a traditional raft foundation, thus avoiding prevalent heat-of-hydration and associated cracking and performance concerns. The thickness of the base slab layer 116 is selected such that the required strength is achieved with a nominal, lower reinforcement ratio suitable to handle punching shear at the edges of the girders 104. In some embodiments, the thickness of the base layer 116 preferably ranges from about 300 mm to about 600 mm.

The girders 104 preferably include downward facing studs 118 (e.g., Nelson™ studs) that are enmeshed with the rebar 114 and the base slab layer 116 and that are sized and spaced to provide sufficient steel to limit the stress range to meet fatigue design requirements. Each of the plurality of girders 104 preferably includes upper girder flanges 120A and lower girder flanges 120B as shown, for example, in FIG. 2. Preferably, the upper girder flanges 120A are bolted to the first outer flange 106A of the base can 102 and the lower girder flanges 120B are bolted to the second outer flange 106B of the base can 102. Each of the plurality of girders 104 also preferably includes a solid girder web 122 and a plurality of stiffener plates 124. Crushed gravel 126 is preferably placed directly adjacent to an upper section 128A of the base can 102 at surface level, covering backfill 130 which is preferably placed along and/or above the girders 104 and base slab layer 116. The backfill 130 will principally be the excavated in situ materials excluding topsoil. Only in instances of saturated soils or unusual soil composition would imported material be required. Backfill will be placed in standard 200 mm to 300 mm lifts compacted to about 95% standard proctor maximum dry density or better to achieve a dense soil ballast over the entire foundation. The top of the base slab layer 116 is screeded to the second outer flange 106B for convenience and to provide assurance of complete contact between the concrete and the underside of the second outer flange 106B. The lower girder flanges 120B preferably include a plurality of "bleed holes" used to observe concrete flow under the girders 104 for this purpose. Corrosion protection will vary based on soil types but typically includes full epoxy coating of all steel components and galvanized bolts, as well as a site-specific designed impressed current grounding and monitoring system.

The radial girders 104 are proportioned at the base can 102 connection based on strength or stiffness. The girder 104 geometry is tapered towards the outside perimeter to maintain a relatively constant section capacity to resistance demand ratio. The can-ends of the girders 104 (the ends of the girders 104 closest to the base can 102) have a short and preferably substantially horizontal sections of the top flange to facilitate the bolted connection to the can. This type of connection is selected because the first outer flange 106A (or "bolting ring") on the base can 102 also facilitates circumferential load distribution and ring stiffness acting as Tee Ring Beams. The connection is preferably designed as a "slip-critical" connection because shifting of the joint could lead to incremental tower misalignment. The structural design of the girders 104 preferably follows typical practice for traditional plate girders for bridges. In fact, in preferred embodiments, the girders 104 and base slab layer of concrete 116 act as a Composite Radial Inverted Bridge Section (CRIBS). The ends of the radial girders 104 are preferably fitted with a support leg 111 including levelling bolt positioned over a steel plate on the mud slab 112 to facilitate level installation prior to concreting.

Figure 3A:
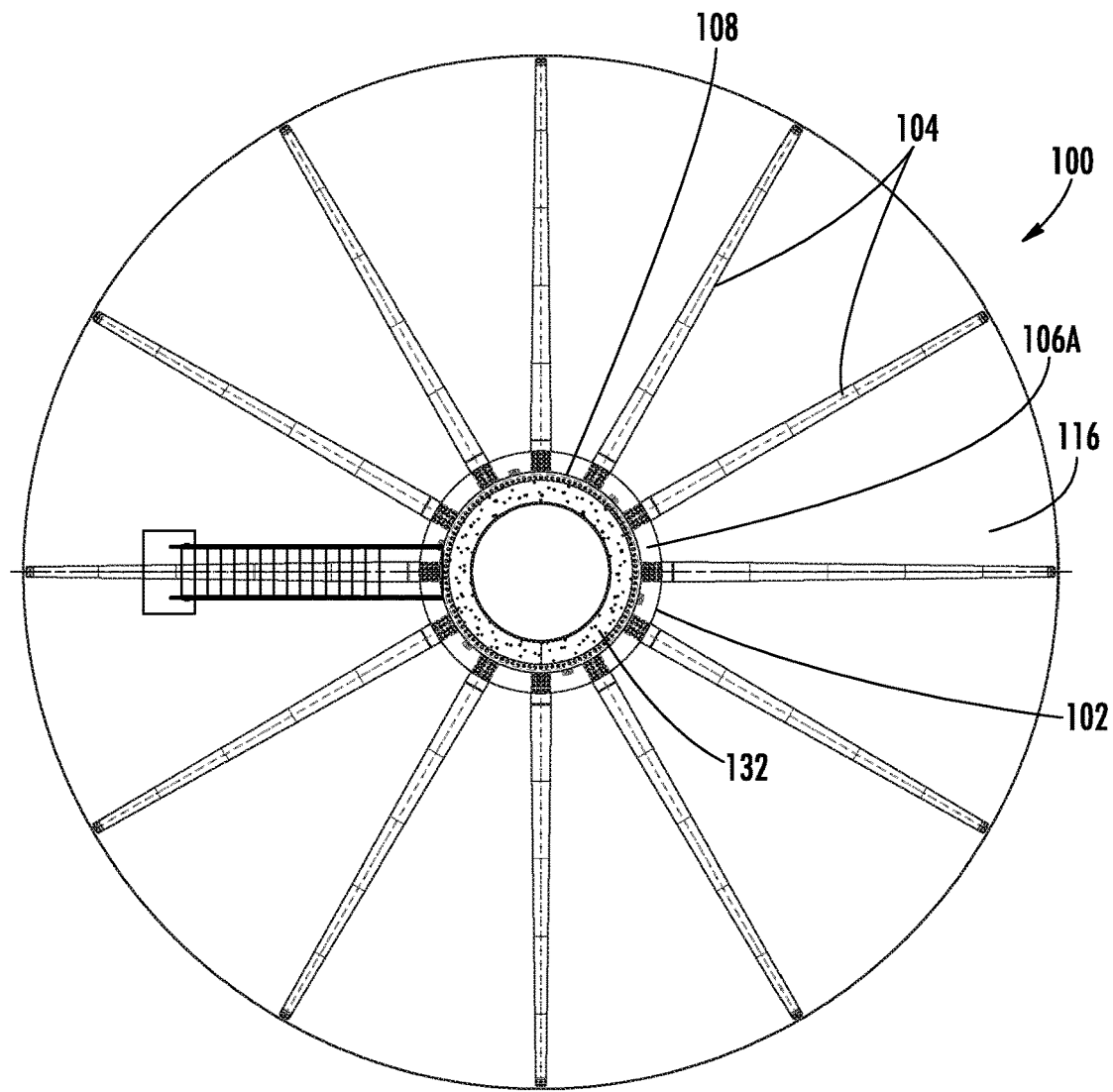
FIG. 3A shows a plan view of the wind turbine foundation shown in FIG. 2 including a plurality of girders attached to a base can like the one shown in FIG. 1.
Figure 3B:
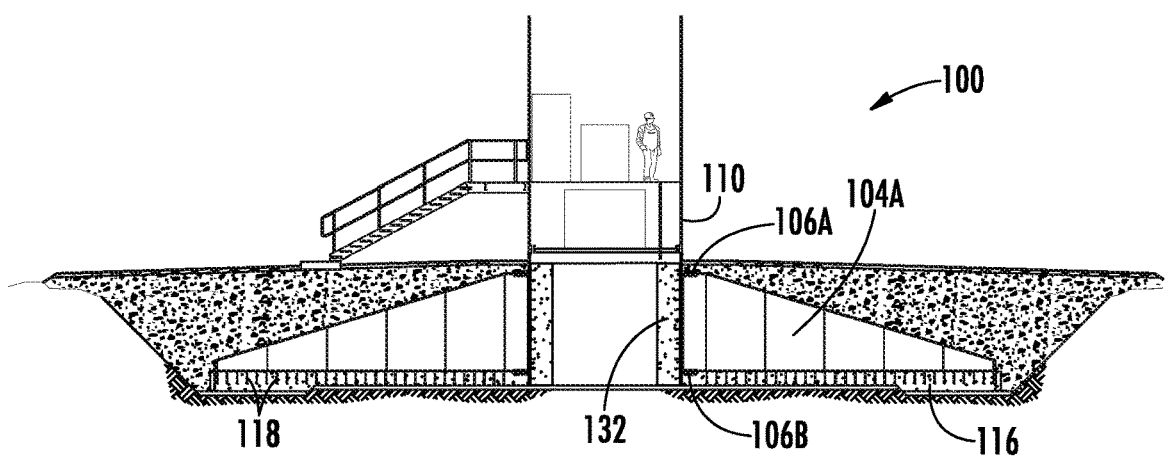
FIG. 3B shows a full side view of the wind turbine foundation shown in FIG. 3A.
Figure 4A:
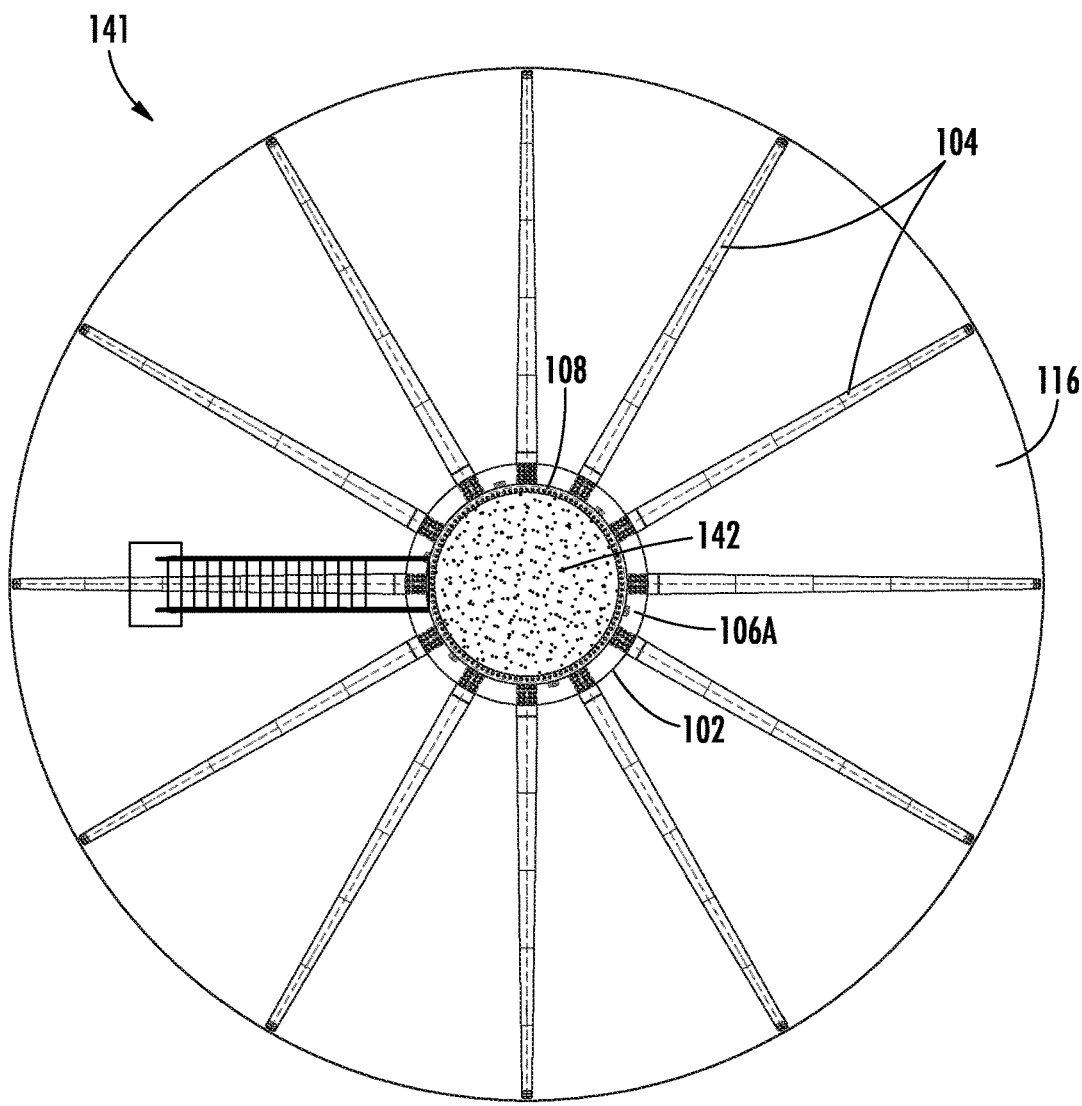
FIG. 4A shows a plan view of a wind turbine foundation including a solid concrete center inside of a base can like the one shown in FIG. 1.
Figure 4B:
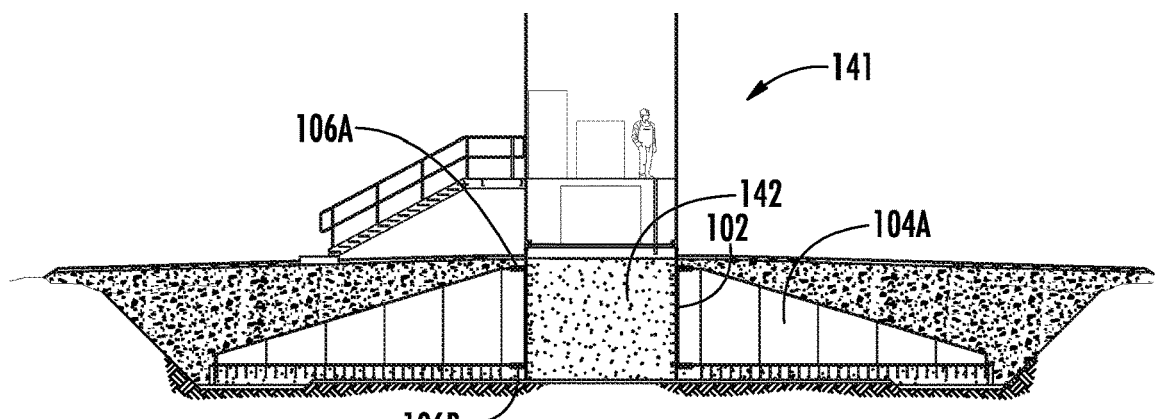
FIG. 4B shows a side view of the wind turbine foundation shown in FIG. 4A.

The embodiment of the wind turbine foundation 100 shown in FIG. 2 through FIG. 3B includes an inner layer ring of concrete 132 located inside the base can 102. The ring of concrete 132 may further include rebar 134 included therein. Granular fill 136 (preferably compacted to at least or about 98% standard proctor maximum dry density) may be added inside the ring of concrete 132. An example of the average size of granular fill that can be used in some embodiments is 40 mm. Additionally or alternatively, gravel could be added inside the ring of concrete 132 for added weight and to discourage water retention. Another layer of rebar 138 and concrete 140 may be added above the ring of concrete 132 and the granular fill 136. In a different embodiment shown in FIGS. 4A and 4B, a wind turbine foundation 141 includes a full concrete core 142 located inside the base can 102. In the embodiments shown in FIG. 2 through FIG. 4B, inward facing studs 144 (e.g., Nelson™ studs) along the base can 102 are preferably included extending inside the base can 102 enmeshed with concrete. Corrugated Steel Pipe (csp) 146 is used to act as sacrificial steel form for the concrete.

Figure 5A:
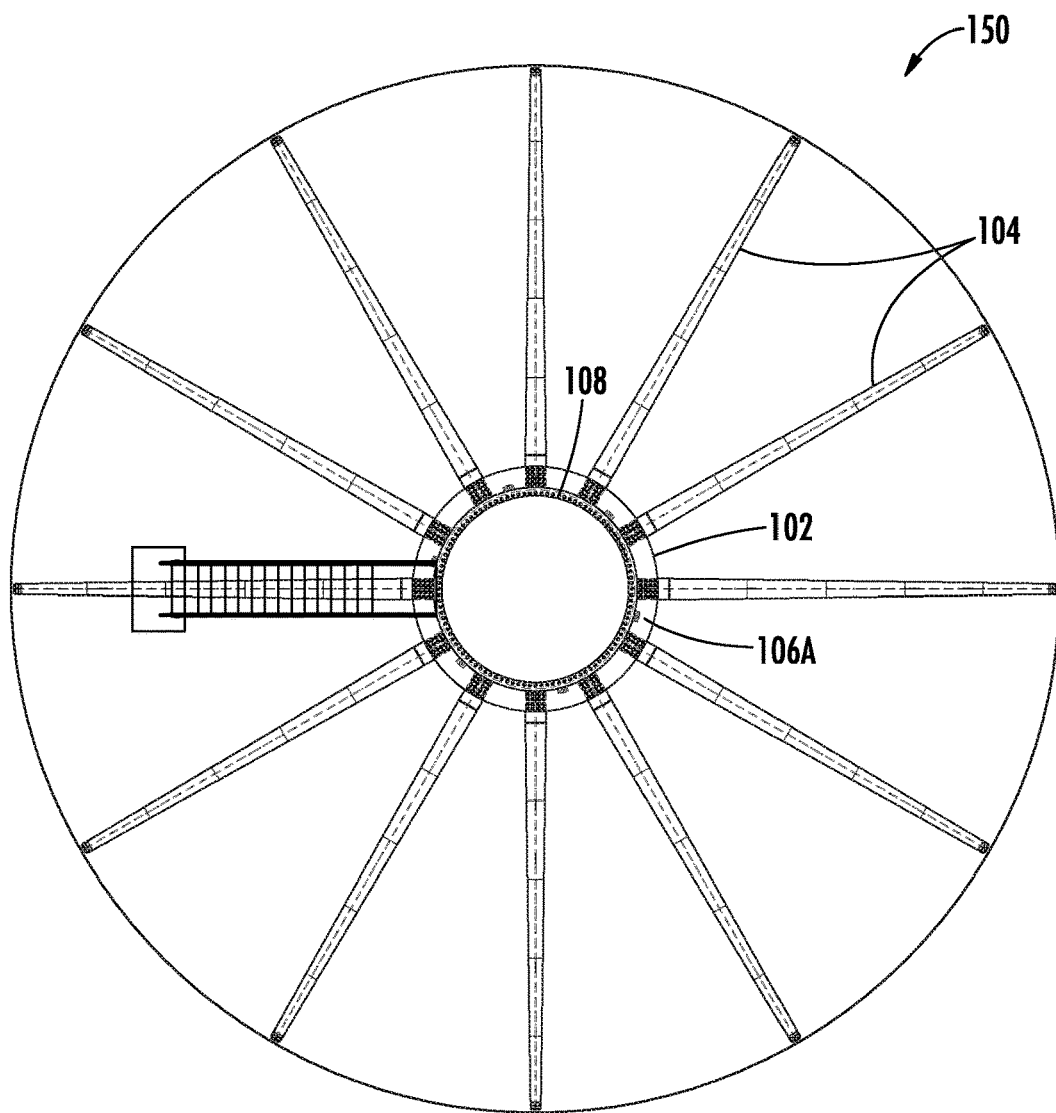
FIG. 5A shows a plan view of a wind turbine foundation including no concrete in the center of a base can like the one shown in FIG. 1.
Figure 5B:
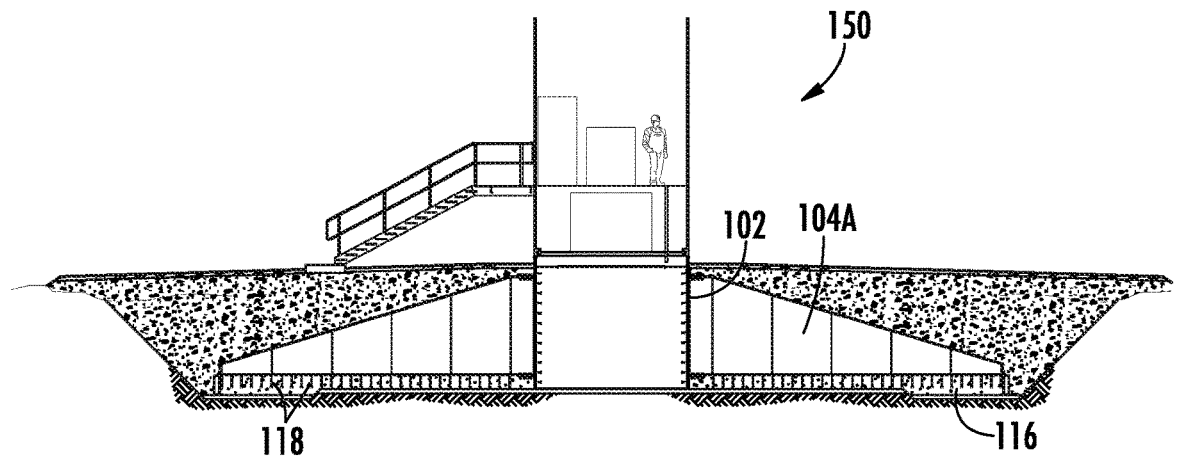
FIG. 5B shows a side view of the wind turbine foundation shown in FIG. 5A.

FIGS. 5A and 5B show an embodiment of a wind turbine foundation 150 including the base can 102 and the plurality of girders 104 but not including a concrete ring or concrete core inside the base can 102. In certain embodiments, it may be preferably to minimize the use of concrete inside the base can 102.

FIG. 6 shows an embodiment of a wind turbine foundation 152 wherein ground excavation 154 for the overall apparatus 152 is tapered. The wind turbine foundation 152 preferably includes a tapered mud slab 156 having a thickness preferably ranging from about 150 mm to about 300 mm. Above the mud slab 156 is a tapered base slab 158 which is preferably made of concrete and preferably reinforced with rebar. The base slab 158 is thickest beneath a base can 102 which is attached to a plurality of girders 104 in similar fashion to the wind turbine foundation 100 described above with reference to FIG. 2 through FIG. 3B. The thickness of the base slab 158 beneath the base can 102 preferably ranges from about 500 mm to about 1500 mm. The girders 104 include downward facing studs 118 which are enmeshed with the base slab 158. Although tapered along a peripheral section 160, a first portion of the base slab 162 is preferably substantially flat beneath the base can 102.

FIG. 7 shows an embodiment of a wind turbine foundation 164 wherein ground excavation 166 for the overall apparatus 164 is in a tapered stepped pattern. The wind turbine foundation 164 preferably includes a tapered stepped mud slab 168 having a thickness preferably ranging from about 150 mm to about 300 mm. Above the mud slab 168 is a tapered stepped base slab 170 which is preferably made of concrete and preferably reinforced with rebar. The base slab 170 is thickest beneath a base can 102 which is attached to a plurality of girders 104 in similar fashion to the wind turbine foundation 100 described above with reference to FIG. 2 through FIG. 3B. The thickness of the base slab 170 beneath the base can 102 preferably ranges from about 500 mm to about 1500 mm. The girders 104 include downward facing studs 118 which are enmeshed with the base slab 170. In a preferred embodiment, the tapered step pattern includes three steps from the periphery of the tapered stepped base slab to its center as shown in FIG. 7.

Figure 8A:
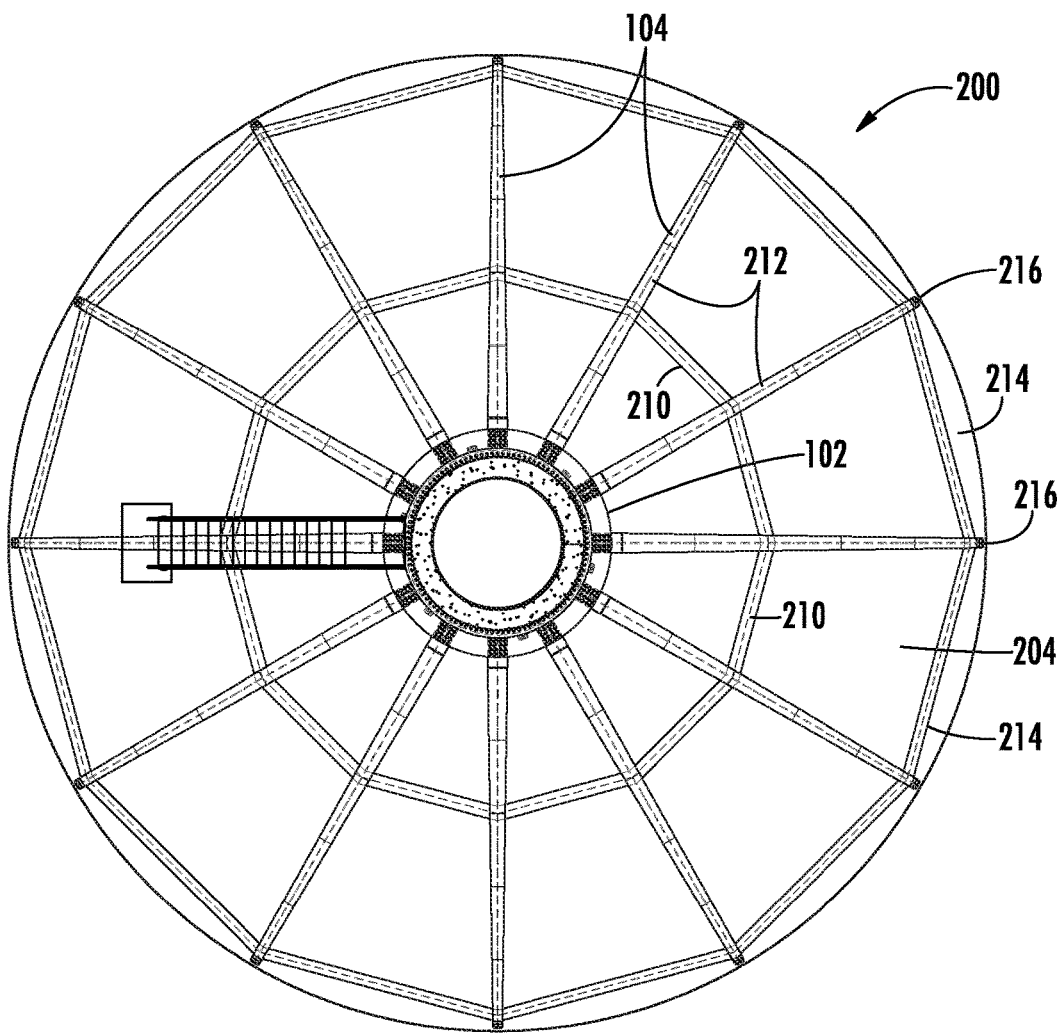
FIG. 8A shows a plan view of a wind turbine foundation including a plurality of transverse girders between a plurality of girders.
Figure 8B:
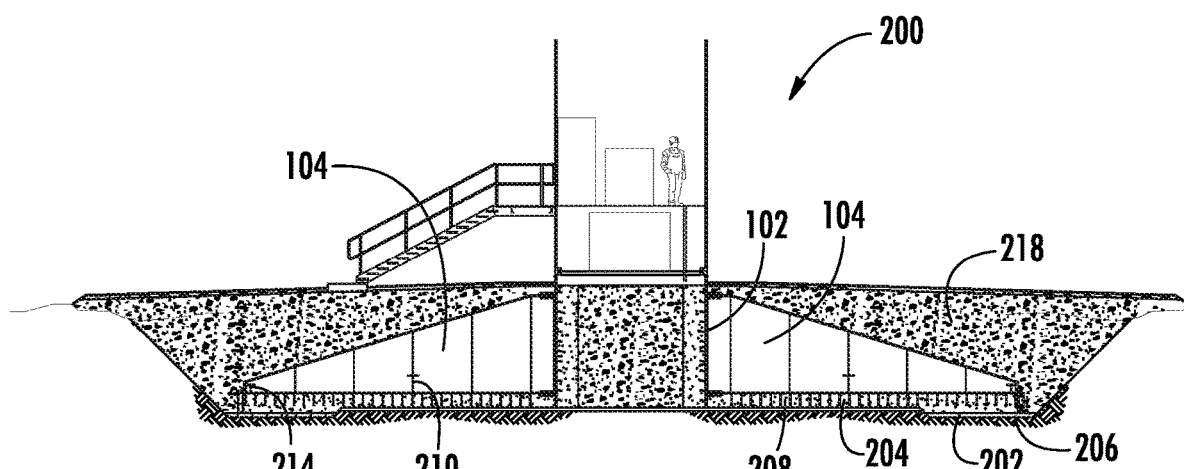
FIG. 8B shows a side view of the wind turbine foundation shown in FIG. 8A.

FIG. 8A and FIG. 8B show views of a wind turbine foundation 200 including a mud slab 202, a base can 102 on or otherwise above the mud slab 202, a base slab 204 preferably made of concrete, and a plurality of girders 104 connected to the base can 102. A peripheral section 206 of the base slab 204 preferably extends deeper into the ground than a central section 208 of the base slab 204. Additional features include a plurality of inner transverse girders 210 connecting midsections 212 of adjacent radial girders 104 together and a plurality of outer transverse 214 connecting outer sections 216 of adjacent radial girders 104 together. The inner transverse girders 210 and outer transverse girders 214 are preferably steel I-beams which are preferably bolted or welded to adjacent girders 104 providing further structural support to the base can 102 and girders 104. Use of the transverse girders in some circumstances could allow for a thinner mud slab or an alternative type of slab such as, for example, corrugated or ribbed steel panels or composite rigid panels. Granular backfill 218 preferably covers the girders 104 and the base slab 204.

Figure 9A:
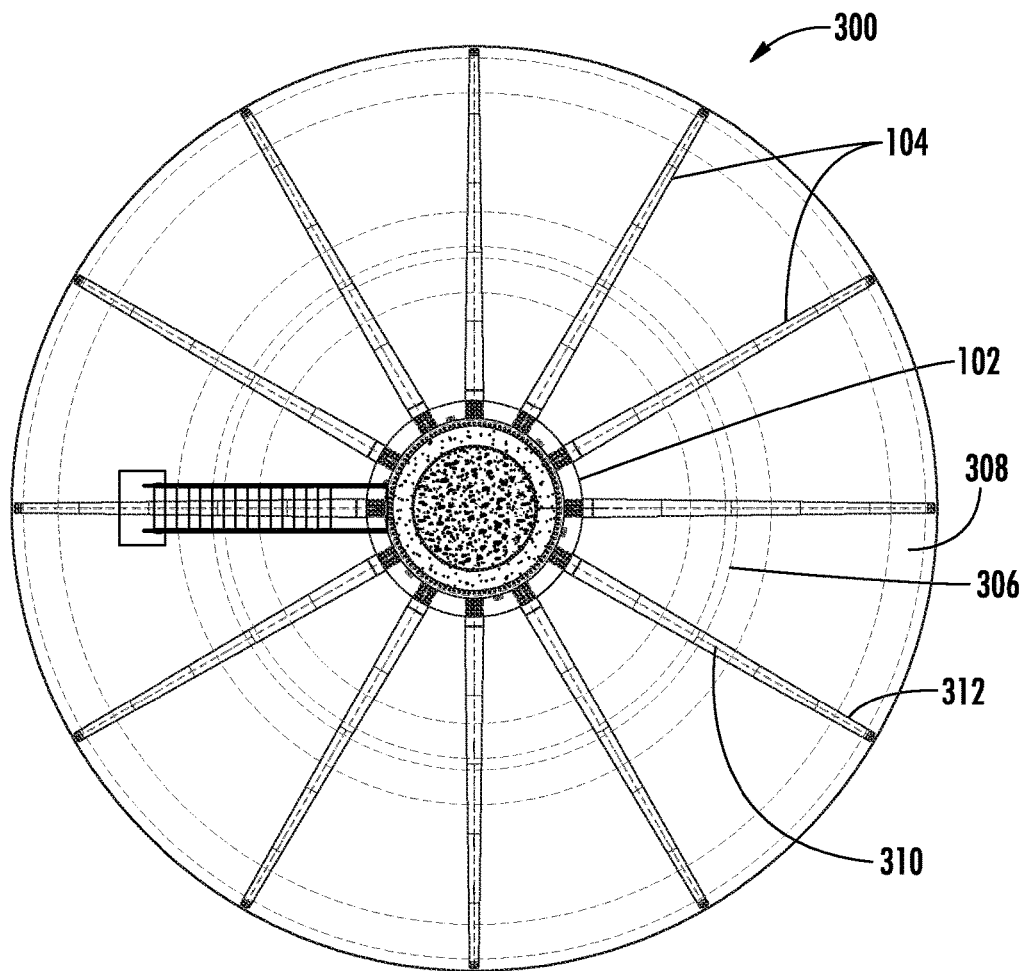
FIG. 9A shows a plan view of a wind turbine foundation including a base slab (or base layer) including an inner beam and an outer beam.
Figure 9B:
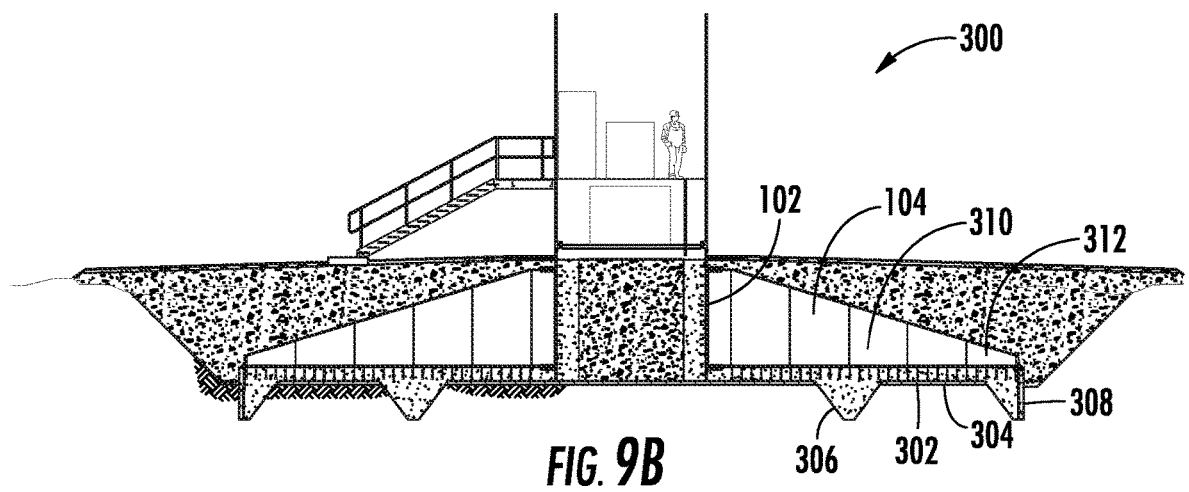
FIG. 9B shows a side view of the wind turbine foundation shown in FIG. 9A.

FIG. 9A and FIG. 9B show views of a wind turbine foundation 300 including a mud slab 302, a base can 102 on or otherwise above the mud slab 302, a base slab 304 preferably made of concrete, and a plurality of girders 104 connected to the base can 102. The base slab 304 preferably includes an inner beam 306 and an outer beam 308 which both extend deeper into the ground than the surrounding portions of the base slab 304. The inner beam 306 is preferably beneath midsections 310 of the girders 104 and the outer beam is preferably beneath outer sections 312 of the girders 104.

Figure 10A:
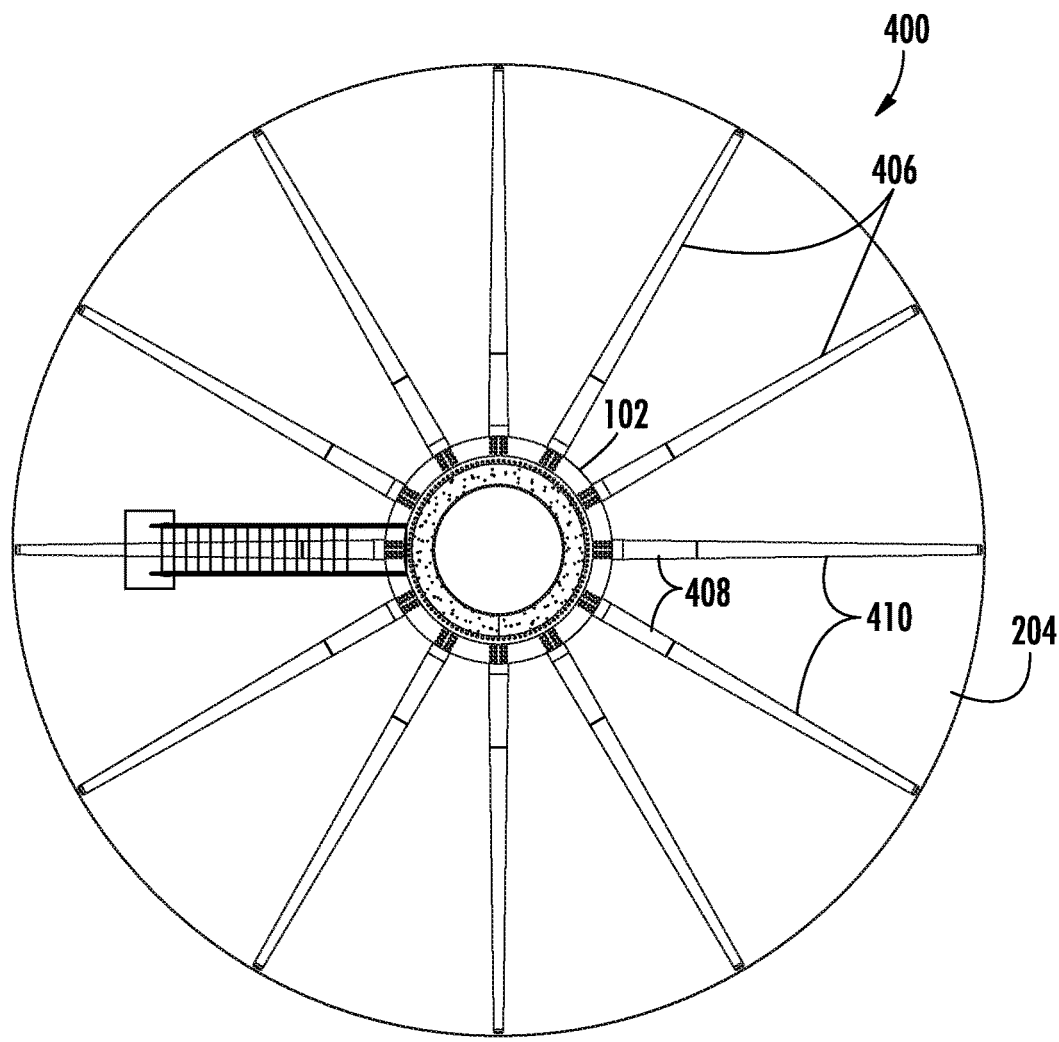
FIG. 10A shows a plan view of a wind turbine foundation including girders with a first tapered profile.
Figure 10B:
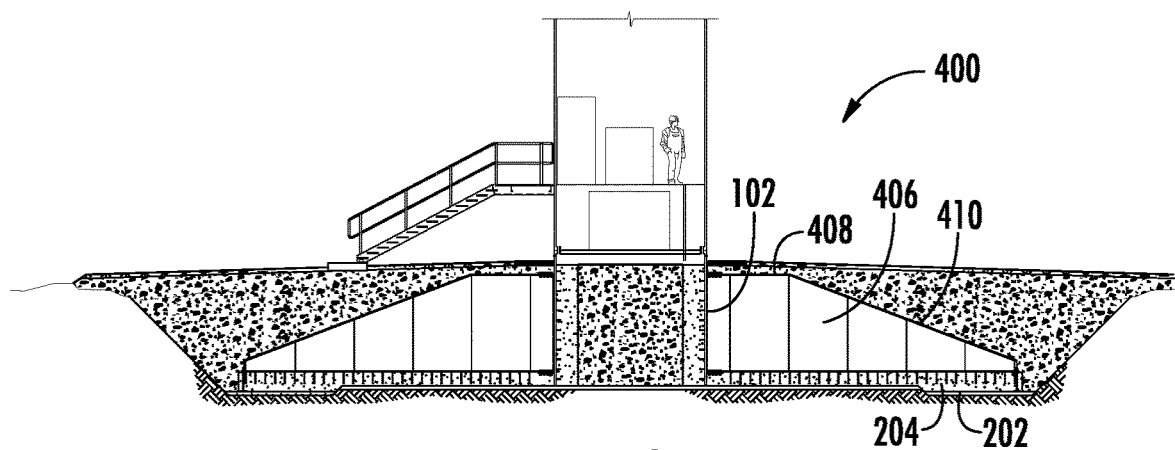
FIG. 10B shows a side view of the wind turbine foundation shown in FIG. 10A.
Figure 11A:
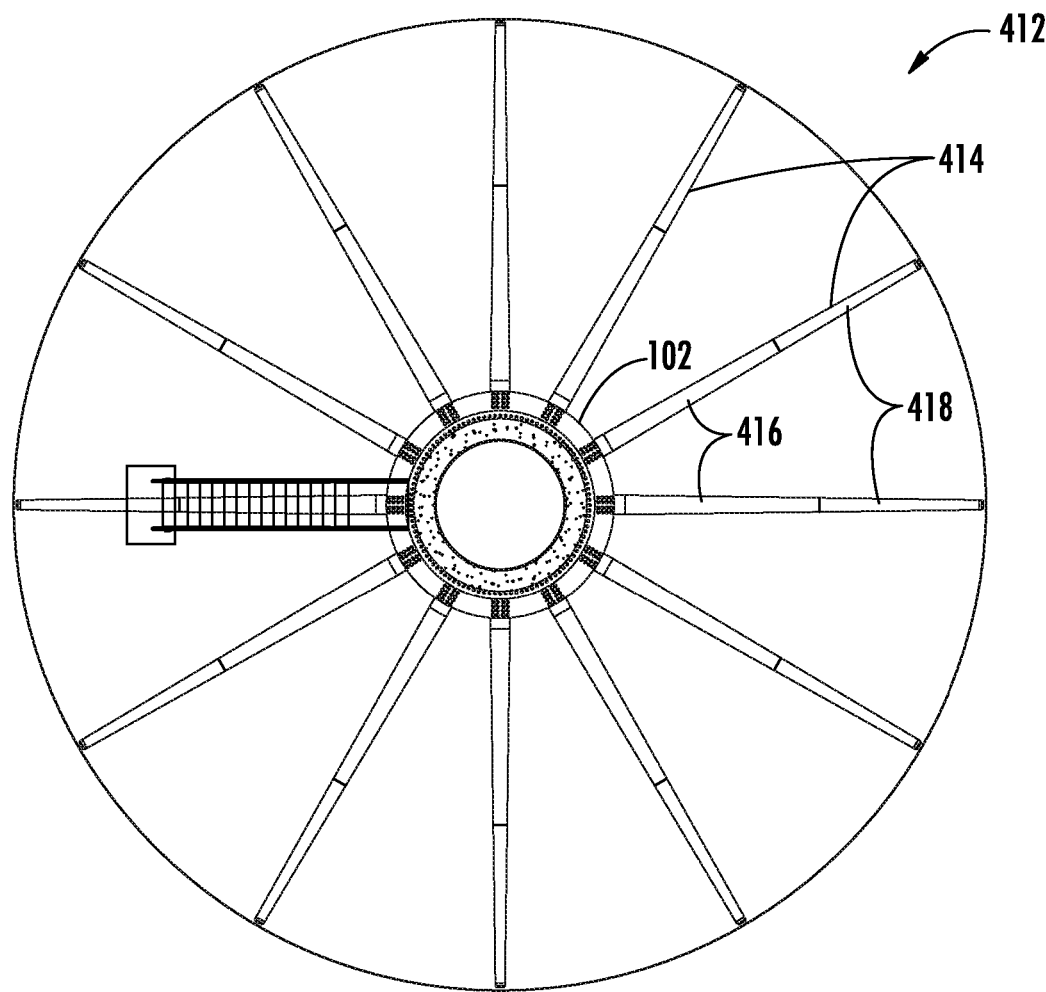
FIG. 11A shows a plan view of a wind turbine foundation including girders with a second tapered profile.
Figure 11B:
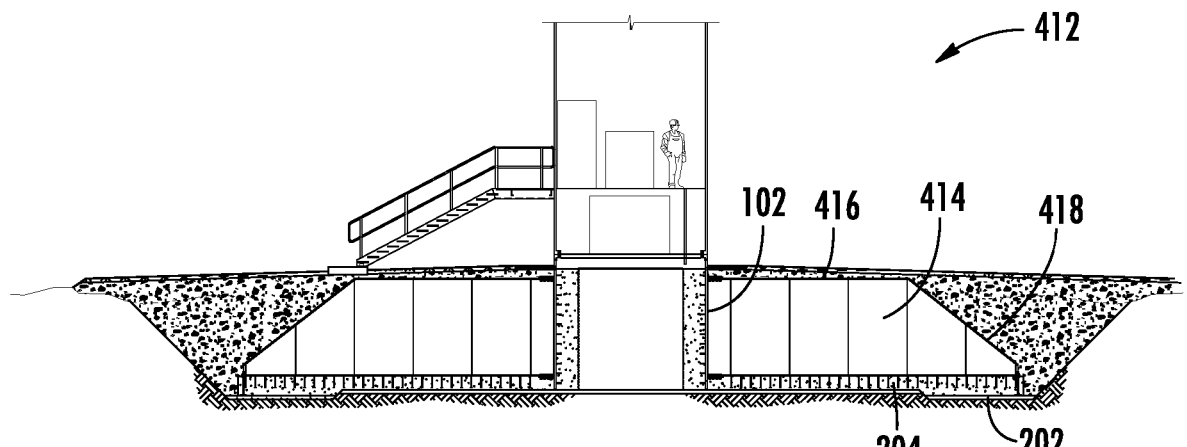
FIG. 11B shows a side view of the wind turbine foundation shown in FIG. 11A.

FIG. 10A and FIG. 10B show views of a wind turbine foundation 400 that includes a mud slab 202, a base can 102 on or otherwise above the mud slab 202, a base slab 204 preferably made of concrete reinforced with rebar, and a plurality of radial girders 406 connected to the base can 102. The plurality of girders 406 are like the plurality of radial girders 104 described above except for profile shape. The girders 406 are preferably tapered as shown and the length of each of the girders 406 preferably ranges from about 8 m to about 15 m and the height of each of the girders 406 at the highest point ranges from about 2.5 m to about 5 m. In the example shown in FIG. 10A and FIG. 10B, rectangular sections 408 of the plurality of girders 406 extend out substantially horizontally from about 20% to about 50% the length of each of the girders 406 before angling downward along tapered sections 410. In another example, a wind turbine foundation 412 shown in FIG. 11A and FIG. 11B includes a plurality of radial girders 414 wherein rectangular sections 416 of the plurality of girders 414 extend out substantially horizontally from about 50% to about 80% the length of each of the girders 414 before angling downward along tapered sections 418 of the girders 414. The girders 414 are preferably tapered as shown and the length of each of the girders 414 preferably ranges from about 4 m to about 12 m and the height of each of the girders 414 at the highest point ranges from about 2 m to about 5 m.

Figure 12:
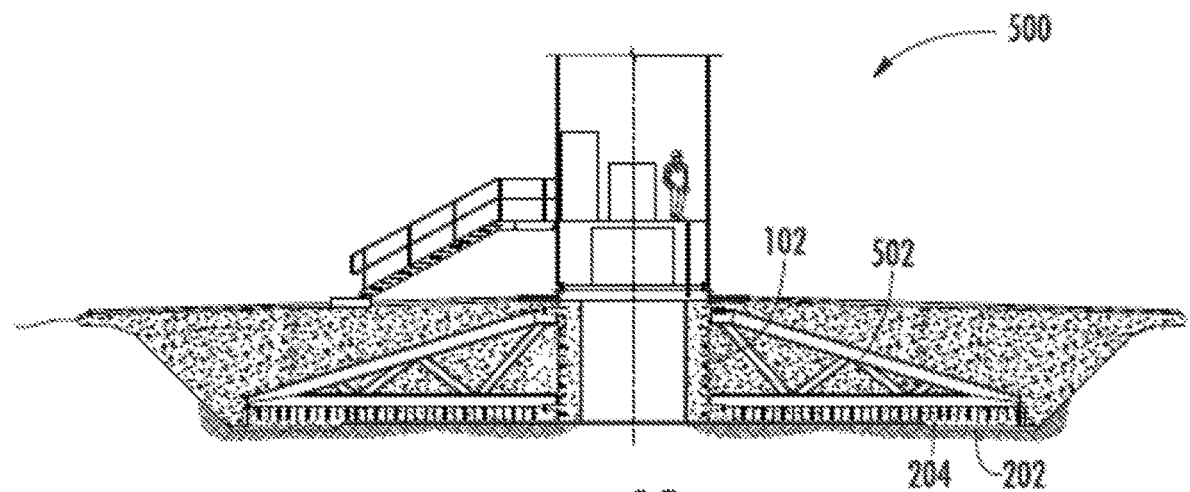
FIG. 12 shows a side view of a wind turbine foundation including a plurality of girder trusses.

FIG. 12 shows a side view of a wind turbine foundation 500 that includes a mud slab 202, a base can 102 on or otherwise above the mud slab 202, a base slab 204 preferably made of concrete reinforced with rebar, and a plurality of radial girders 502 connected to the base can 102. The plurality of girders 502 are like the plurality of girders 104 described above; however, the plurality of girders 502 shown in FIG. 12 include girder trusses (open web girders) which allows for the plurality of girders 502 to be lighter than the formerly described plurality of girders 104 but maintain substantially the same level of strength. Each of the girders 502 is preferably tapered and preferably has a length ranging from about 8 m to about 15 m and a height at the highest point ranging from about 2.5 m to about 5 m.

Figure 13A:
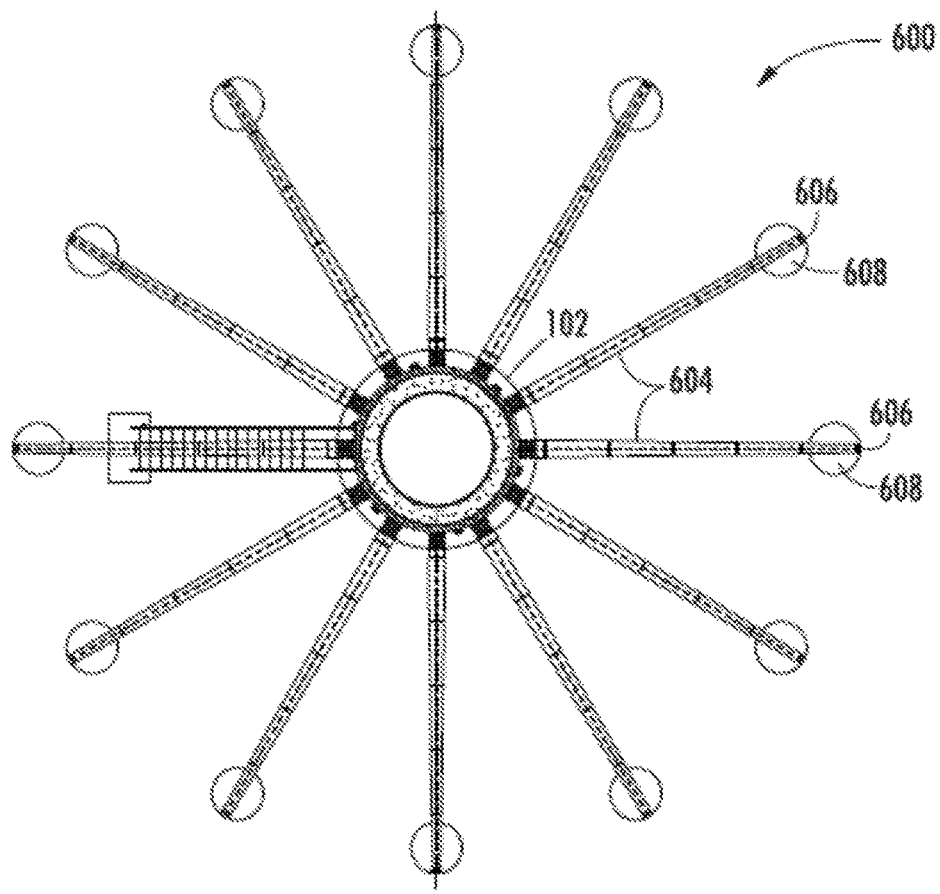
FIG. 13A shows a plan view of a wind turbine foundation comprising a base can, a plurality of girders connected to the base can, and a plurality of piles supporting the plurality of girders with one pile per girder.
Figure 13B:
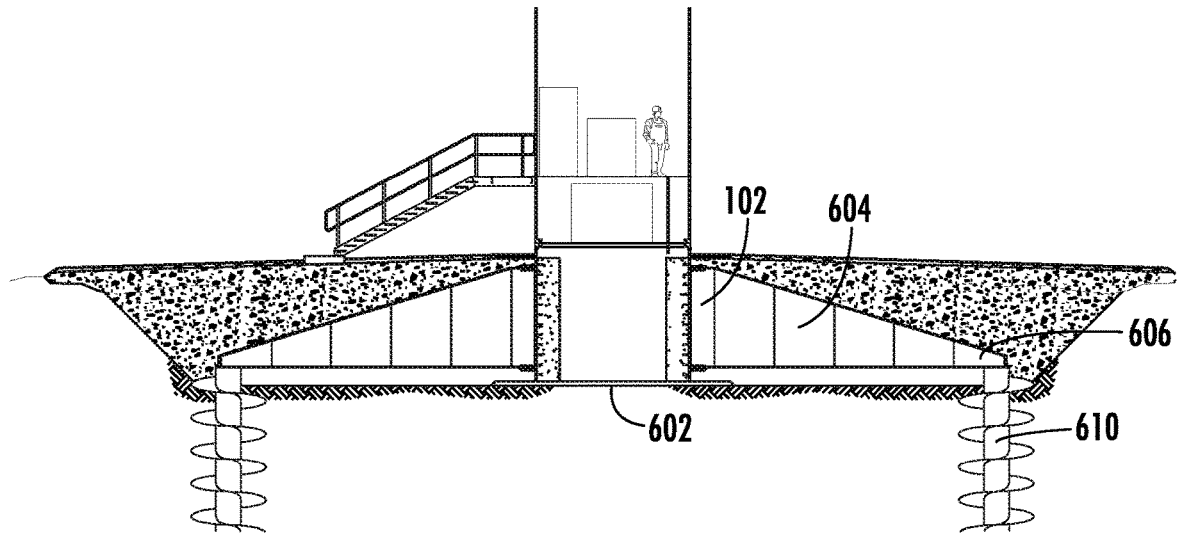
FIG. 13B shows a side view of the wind turbine foundation shown in FIG. 13A wherein the plurality of piles includes a plurality of screw piles.
Figure 13C:
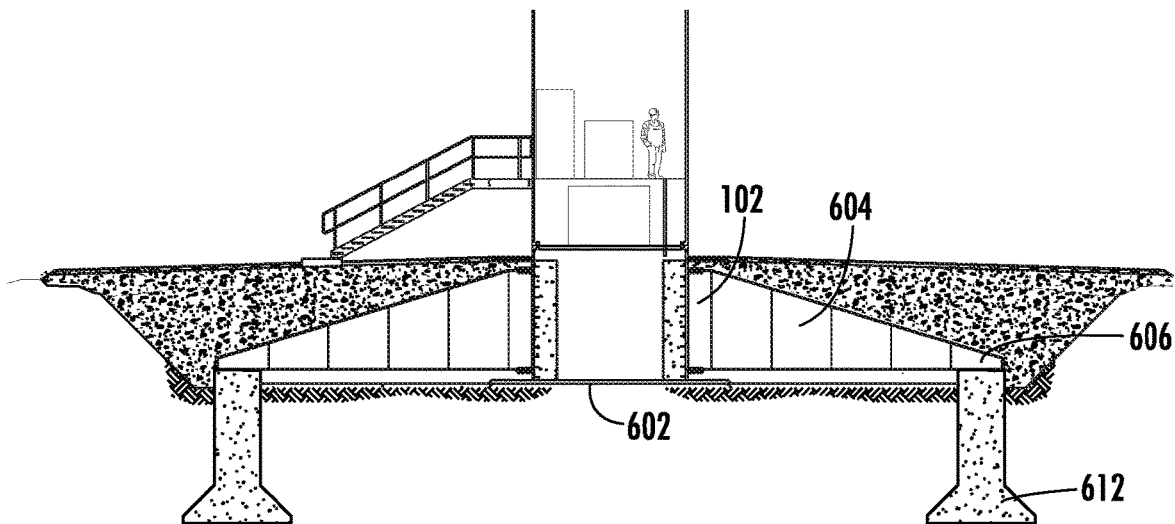
FIG. 13C shows a side view of the wind turbine foundation shown in FIG. 13A wherein the plurality of piles includes a plurality of concrete bell piles.

FIG. 13A shows a plan view of a wind turbine foundation 600 including a leveling slab 602, a base can 102, and a plurality of radial girders 604 connected to the base can 102. The plurality of girders 604 are supported at distal ends 606 by a plurality of piles 608 extending into the ground. Each of the girders 604 is preferably tapered and preferably has a length ranging from about 5 m to about 15 m and a height at the highest point ranging from about 2 m to about 5 m. FIG. 13B shows an example in which the plurality of piles 608 include helical piles 610. FIG. 13C shows an example in which the plurality of piles include concrete bell piles 612. In cases where there are soft soils near the surface and stiffer soils or bedrock at depth using piles 608 to provide support will sometimes be advantageous as opposed to making the overall foundation much larger in diameter. Types of piles 608 that can be used include, without limitation, pipe piles, H piles, helical screw piles and concrete bell piles depending on the soil properties, groundwater depth and depth to the firm soils or bedrock. The piles 608 may be used alone with just the radial girders (buried or not buried) such that no concrete base slab is used. However, the piles may also be used in combination with a concrete base slab and buried as usual depending on the soil characteristics, groundwater depth and load requirements. In the case of expanding clay soil in the upper soil strata, piles 608 may be used in combination with a compressible foam panel or similar void form placed under the mud slab, base slab or girders to prevent the soil expansion from imposing uplift forces on the foundation.

Figure 14A:
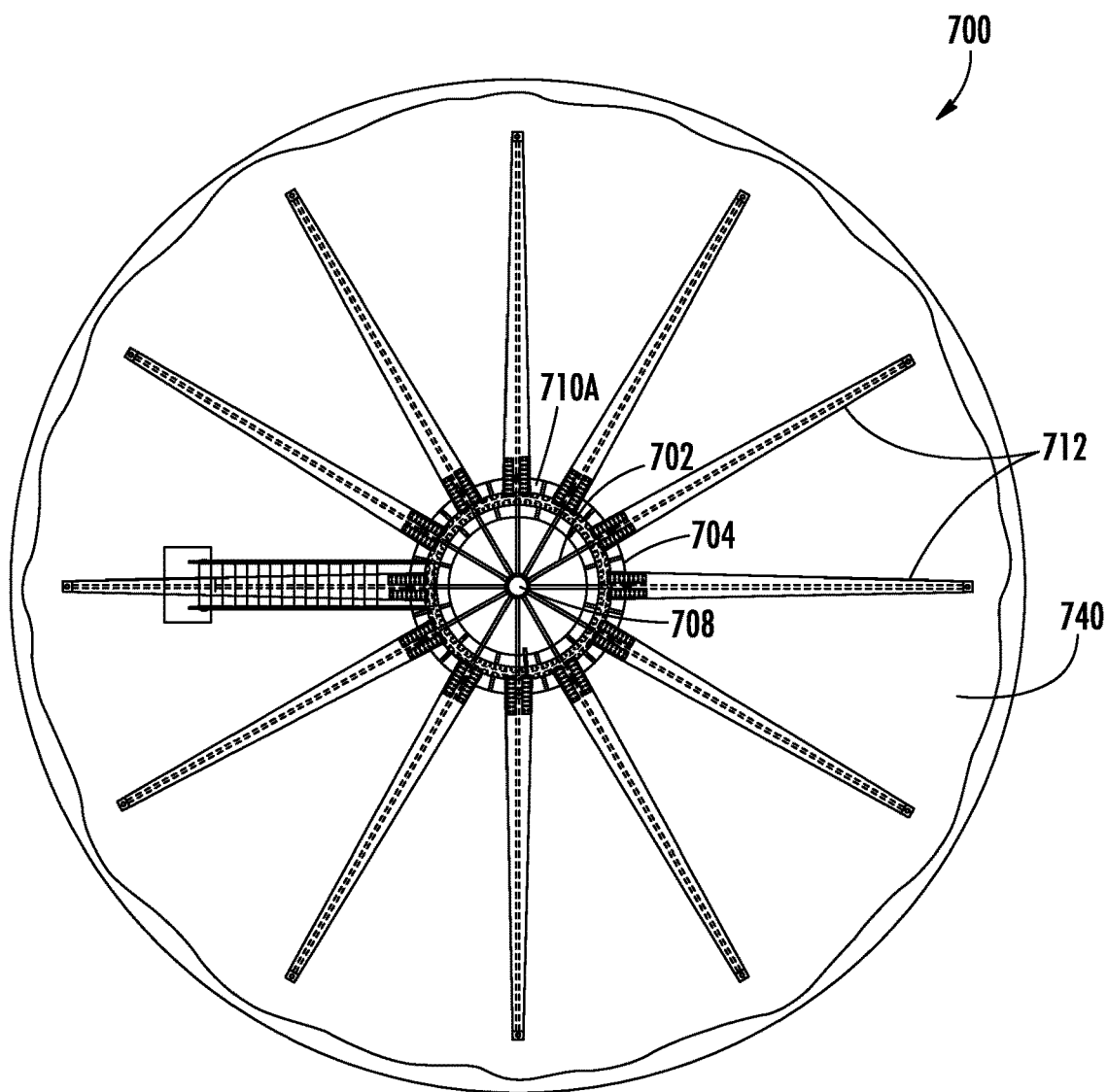
FIG. 14A shows a plan view of a wind turbine foundation including a base can including radial stiffeners inside the base can connected to a central core member and the inside of the base can.

The base can generally requires increased shear stiffness relative to the towers above to provide overall rotational stiffness. In some embodiments, this is achieved by a combination of inner radial stiffeners 702 connected (preferably by welding) to the inside of a base can 704 as required by site conditions and turbine manufacturer requirements. For additional strength and support, concrete can be added in the base can 704 between the radial stiffeners 702. An example of a wind turbine foundation 700 including these features is shown in FIGS. 14A-14G. FIG. 14A shows a plan view of the wind turbine foundation 700 including the base can 704, inner radial stiffeners 702 connected to a central core member 708 (e.g., a steel pipe) along proximal edges and connected to the inside surface of the base can 704 along distal edges. The radial stiffeners 702 preferably include steel stiffener plates which can be connected to the base can 704 by, for example, welding or using bolts.

Figure 14B:
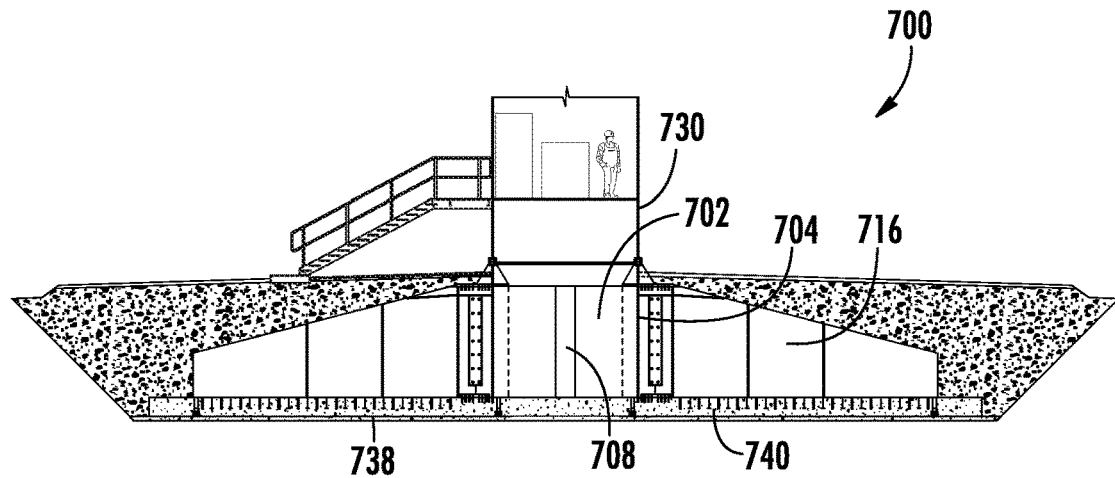
FIG. 14B shows a side view of the wind turbine foundation shown in FIG. 14A.
Figure 14C:
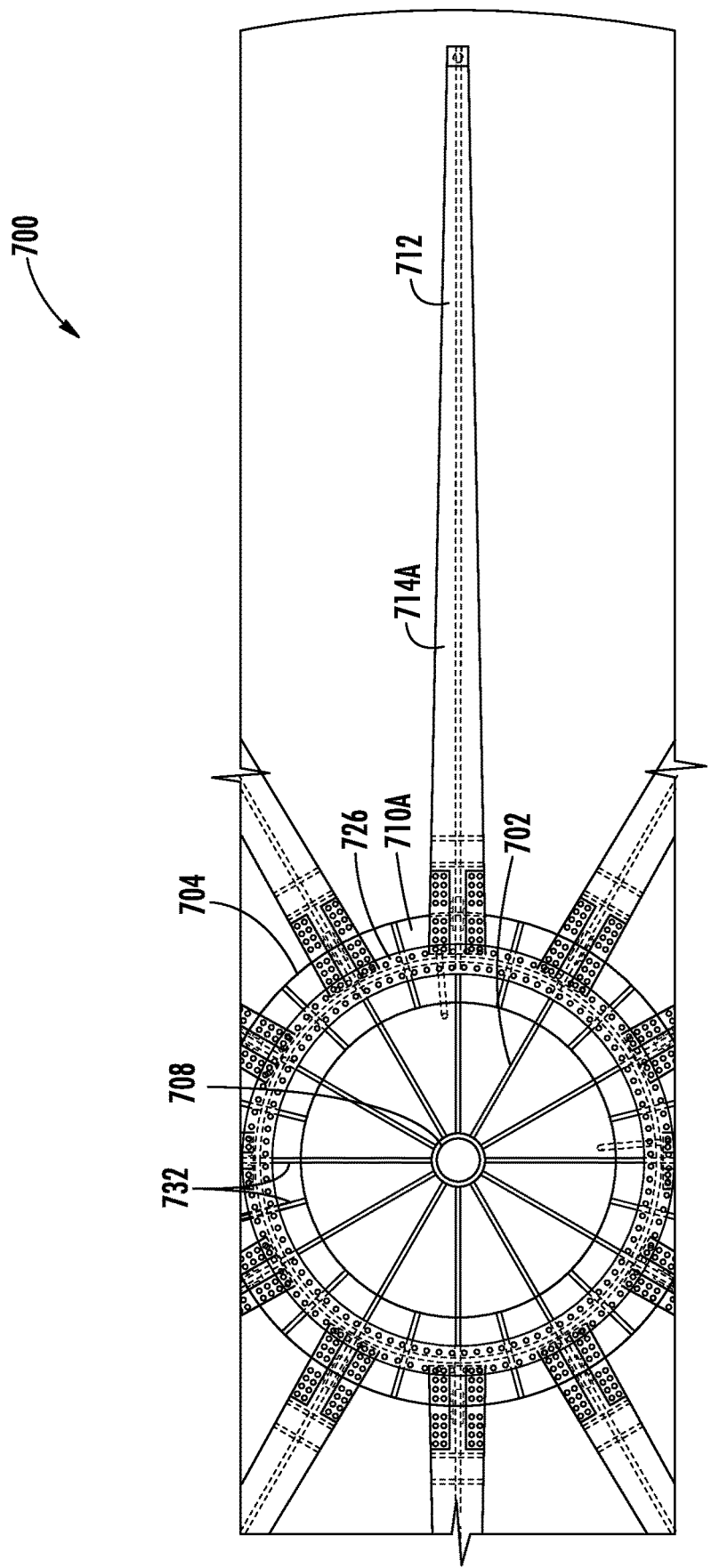
FIG. 14C shows a partial plan view of the wind turbine foundation shown in FIG. 14A and FIG. 14B.
Figure 14E:
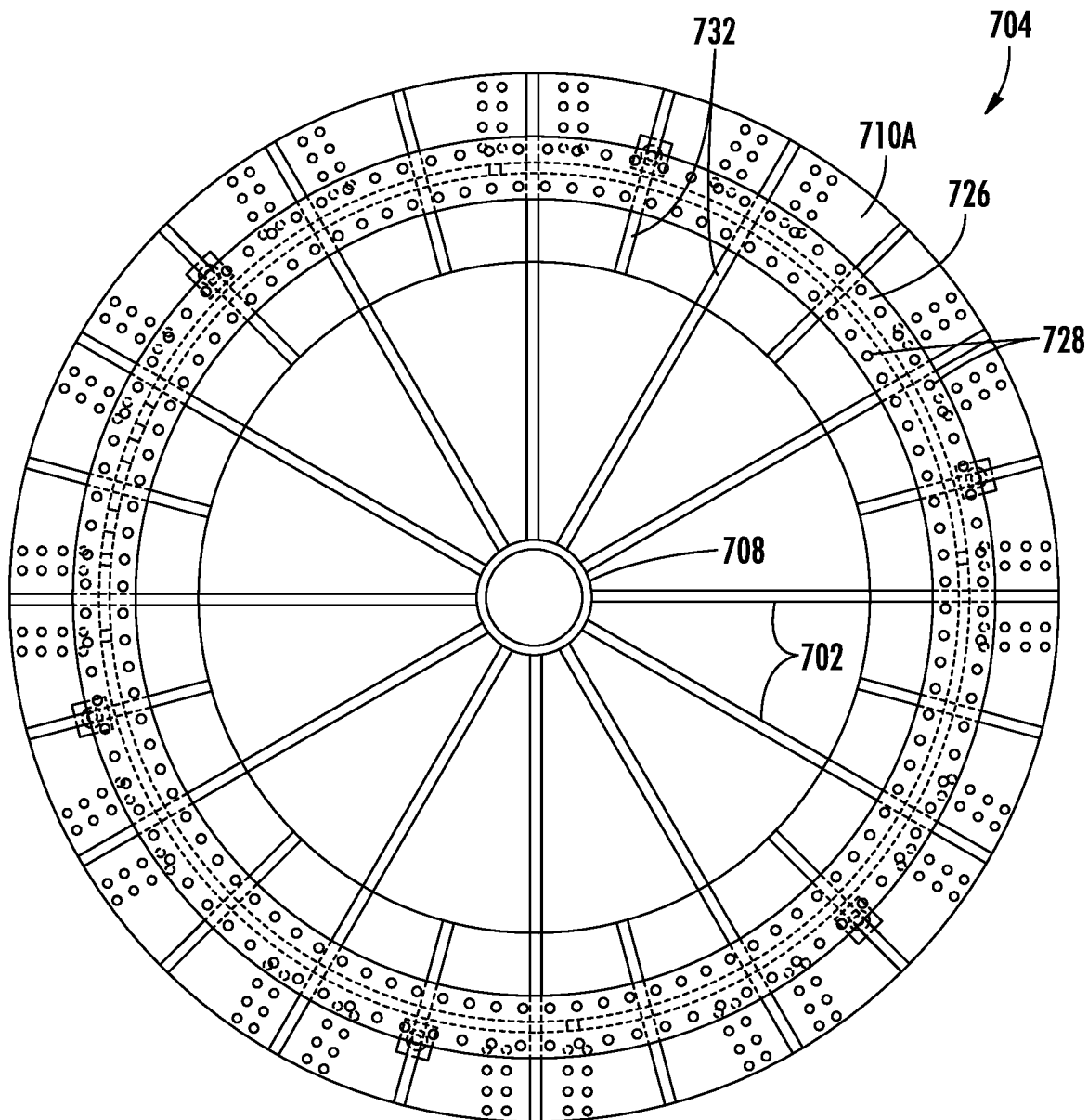
FIG. 14E shows a plan view of the base can used in the wind turbine foundation shown in FIGS. 14A-14D.
Figure 14G:
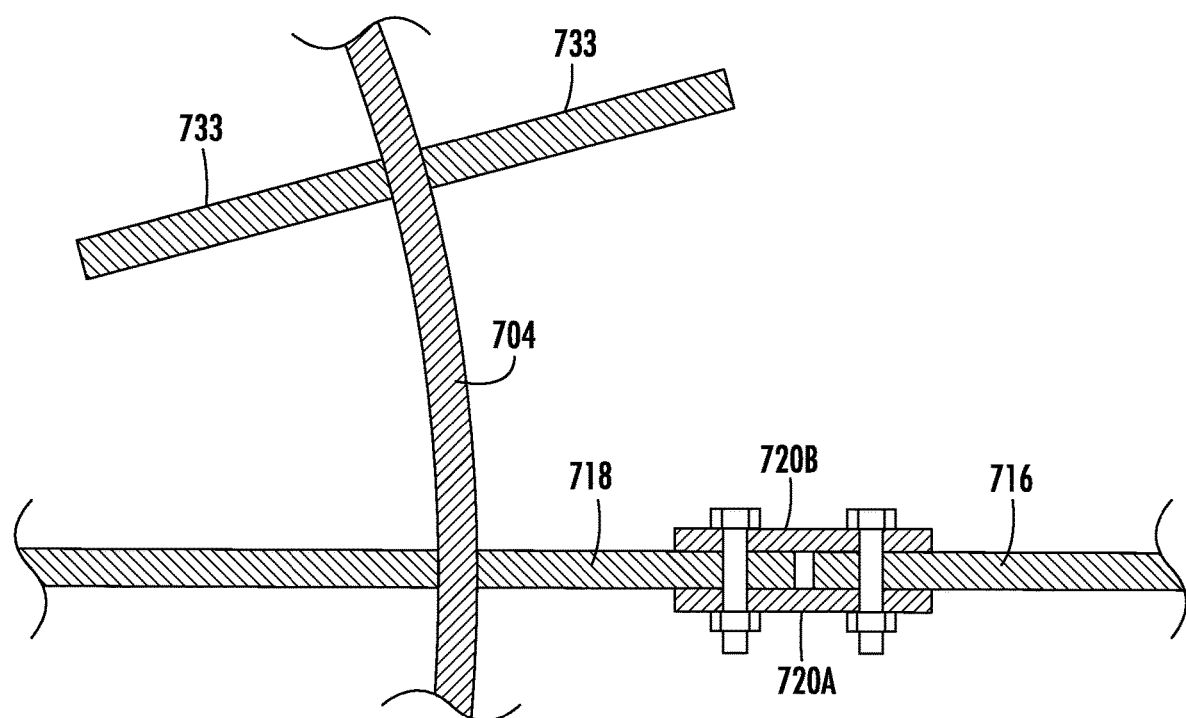
FIG. 14G shows a partial view looking down cut from a line shown in FIG. 14F.

FIG. 14B shows a side view, FIG. 14C shows a closer partial plan view, and FIG. 14D shows a closer partial side view of the wind turbine foundation 700. FIG. 14E shows a plan view of the base can 704 by itself. FIG. 14F shows a close-up side view of the wind turbine foundation 700 cut along a line revealing what is shown in FIG. 14G. In these various figures, different features are shown including a first outer flange 710A near the top of the base can 704 and a second outer flange 710B near the bottom of the base can 704. A plurality of radial girders 712 are connected to the base can 704. Each of the girders 712 includes upper girder flanges 714A, lower girder flanges 714B, and girder webs 716. Each of the girders 712 is preferably tapered as shown and preferably has a length ranging from about 8 m to about 15 m and a height at the highest point ranging from about 2.5 m to about 5 m The base can 704 further includes a plurality of vertical flanges 718 which extend between the first outer flange 710A and the second outer flange 710B. The vertical flanges 718 are preferably situated directly adjacent to the girder webs 716 and first vertical plates 720A and second vertical plates 720B are preferably situated on either side, overlapping the vertical flanges 718 and the girder webs 716 such that, for example, bolts can be used to connect the vertical flanges 718, girder webs 716, first vertical plates 720A and second vertical plates 720B together. A close-up view of this is shown in FIG. 14G. In addition to this connection, the first outer flange 710A is preferably connected to the upper girder flanges 714A using, for example, bolts tightened through first upper horizontal plates 722A and second upper horizontal plates 722B as shown in FIG. 14F. Similarly, the second outer flange 710B is preferably connected to the lower girder flanges 714B using, for example, bolts tightened through first lower horizontal plates 724A and second lower horizontal plates 724B as shown in FIG. 14F.

The base can 704 further includes a tower flange 726 which preferably extends inward and outward (like a "T"), preferably with at least two rows of apertures 728 through which bolts can be inserted to attach a first tower piece 730 to the wind turbine foundation 700. The base can 704 preferably includes upper stiffener plates 732 which preferably extend from the first outer flange 710A to or near the tower flange 726 and alternating partial stiffener plates 733 which alternate between inner radial stiffeners 702. The upper stiffener plates 732 are preferably dispersed in line with girder webs 716 as well as spaces in between where girder webs 716 are angled toward the base can 704 as shown, for example, in FIG. 14E. The base can 704 and girders 712 are preferably placed on support legs 734 including leveling bolts for leveling the base can 704 and girders 712 above rebar 736 on a mud slab 738. After leveling is completed, a base layer 740 of concrete can be poured. The girders preferably include downward facing studs 742 (e.g., Nelson™ studs) that are enmeshed with the rebar 736 and the base layer base layer 740 and that are sized and spaced to provide sufficient steel to limit the stress range to meet fatigue design requirements.

Figure 15A:
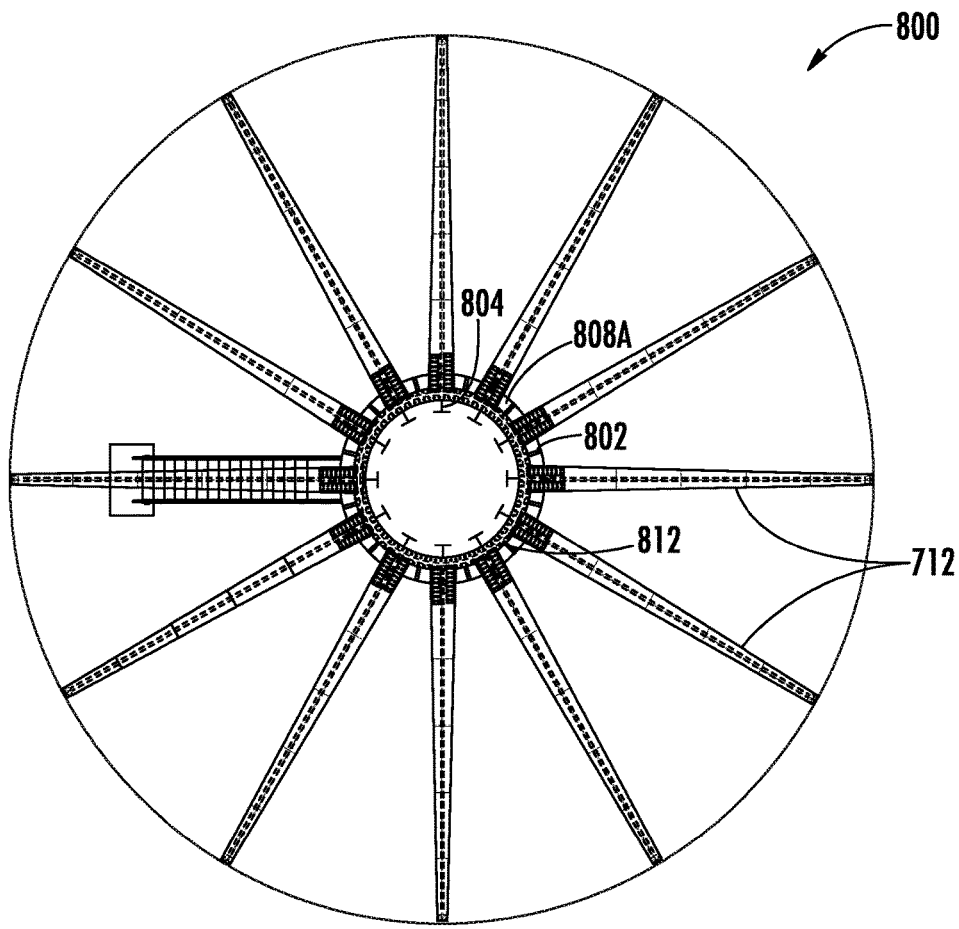
FIG. 15A shows a plan view of a wind turbine foundation including a base can including vertical beams connected to the inside of the base can at locations adjacent to where girders are connected to the base can.
Figure 15B:
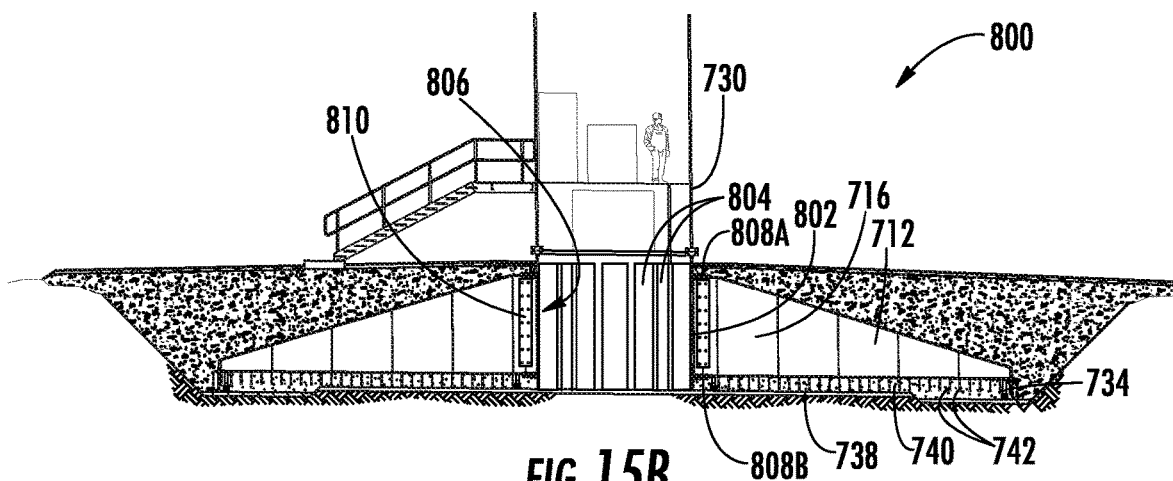
FIG. 15B shows a side view of the wind turbine foundation shown in FIG. 15A.

FIG. 15A and FIG. 15B show an embodiment of a wind turbine foundation 800 including a base can 802 and a plurality of girders 712 connected to the base can 802. Inside the base can 802, metal beams 804 (e.g., H beams) are connected (preferably by welding or field bolted) to an inside surface 806 of the base can 802 at locations adjacent to where girders 712 are connected to the base can 802. The base can 802 further includes a first outer flange 808A near the top of the base can 802 and a second outer flange 808B near the bottom of the base can 802. Each of the girders 712 includes upper girder flanges 714A, lower girder flanges 714B, and girder webs 716. The base can 802 further includes a plurality of vertical flanges 810 which extend between the first outer flange 808A and the second outer flange 808B. The vertical flanges 810 are preferably situated directly adjacent to the girder webs 716 and first vertical plates 720A and second vertical plates 720B are preferably situated on either side, overlapping the vertical flanges 810 and the girder webs 716 such that, for example, bolts can be used to connect the vertical flanges 810, girder webs 716, first vertical plates 720A and second vertical plates 720B together. A close-up view of this type of connection in a previous related embodiment is shown in FIG. 14G. In addition to this connection, the first outer flange 808A is preferably connected to the upper girder flanges 714A using, for example, bolts tightened through first upper horizontal plates 722A and second upper horizontal plates 722B. Similarly, the second outer flange 808B is preferably connected to the lower girder flanges 714B using, for example, bolts tightened through first lower horizontal plates 724A and second lower horizontal plates 724B. An example of these types of connections is shown in a previous embodiment shown in FIG. 14F.

The base can 802 further includes a tower flange 812 which, in this embodiment, extends inward and outward (like a "T"), preferably with at least two rows of apertures through which bolts can be inserted to attach a first tower piece 730 to the wind turbine foundation 800. The base can 802 and girders 712 are preferably placed on support legs 734 including leveling bolts for leveling the base can 802 and girders 712 above rebar 736 on a mud slab 738. After leveling is completed, a base layer 740 of concrete can be poured. The girders preferably include downward facing studs 742 (e.g., Nelson™ studs) that are enmeshed with the rebar 736 and the base layer 740 and that are sized and spaced to provide sufficient steel to limit the stress range to meet fatigue design requirements.

Figure 16A:
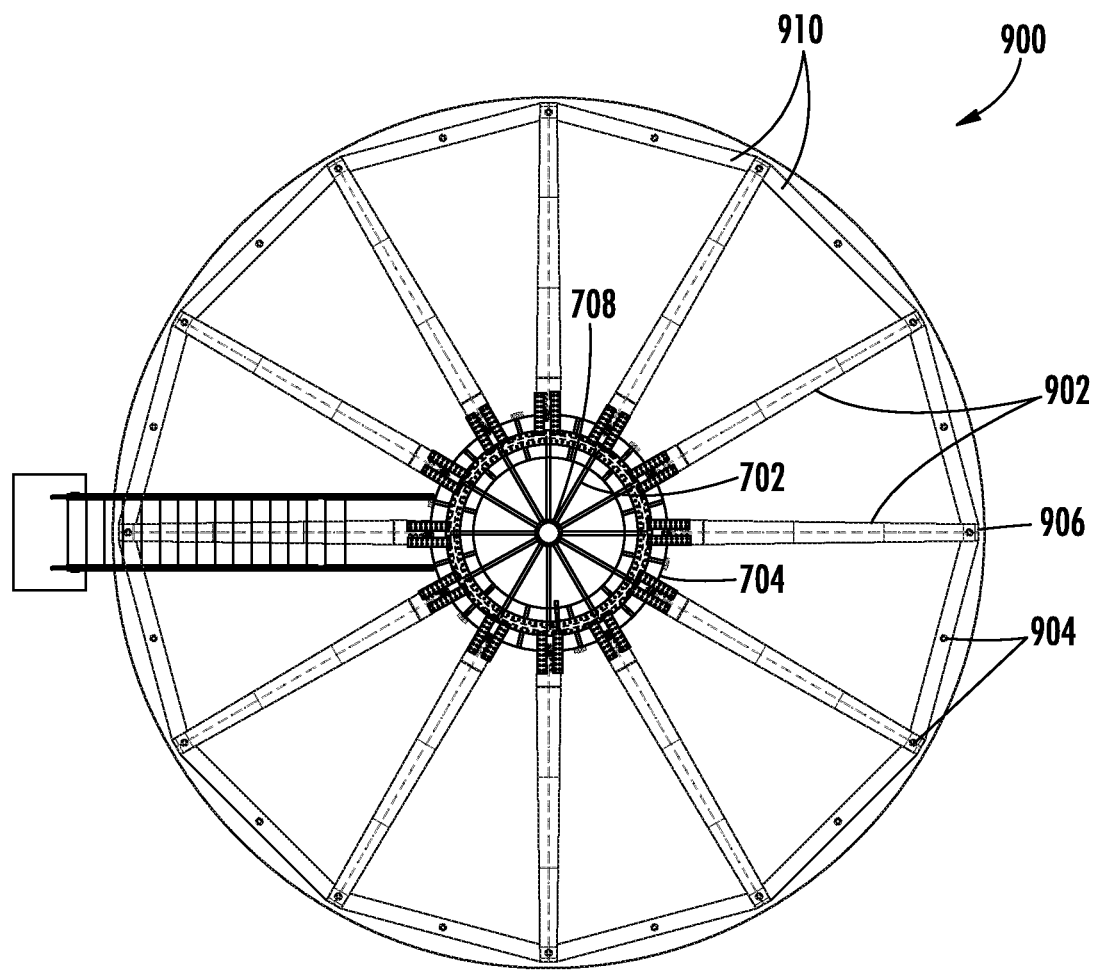
FIG. 16A shows a wind turbine foundation including a plurality of girders connected to a base can, transverse girders between and connected to pairs of girders, and rock anchors connected to distal ends of the plurality of girders and along the transverse girders.

FIG. 16A and FIG. 16B show a different embodiment including a wind turbine foundation 900 which would typically be used when suitable bedrock is close or at the surface at a location where a wind turbine is to be built. Depending on the rock characteristics and the degree of rock weathering or quality, the foundation 900 may be either placed on the surface without backfill or excavated and backfilled as per previously described foundation installations with a concrete base slab or not. Given the stronger rock qualities for bearing and support, the diameter of the overall foundation 900 would typically be smaller and the forces would project out to the ends of a plurality of radial girders 902. As such, in preferred embodiments, the girders 902 would not be tapered like those of the pure gravity base versions described above. The foundation 900 preferably includes the base can 704 including radial stiffeners 702, central core member 708, first outer flange 710A, second outer flange 710B, and vertical flanges 718. The girders 902 are preferably connected to the base can in the same manner as the connection between the girders 712 and the base can 704 shown in FIGS. 14A-14G.

The girders 902 include rock anchors 904 at distal ends 906 of the girders 904 wherein the anchors 904 penetrate into surrounding bedrock. The rock anchors 904 will be drilled in place to a depth suitable to meet the uplift force requirements according to the rock mechanics and bonding design, and some consolidation grouting of the surrounding rock also may be required. Typically, a double corrosion protected grouted bar anchor will be used in this application with post tensioning. However, a multi-strand cable anchor or multiple bar anchor with some canting could also be deployed. Rock anchor heads 908 at the top of the rock anchors 904 preferably would be designed to be accessible to check their post tensioning from time to time and the anchor heads 908 preferably will be corrosion protected with removable caps and grease or a similar system. The wind turbine foundation 900 also preferably includes a plurality of transverse girders 910 preferably connected between at the ends 906 of the girders 902. Preferably, one or more rock anchors 904 are also connected to the transverse girders between the radial girders 902.

In another aspect, an embodiment of a wind turbine foundation 1000 and associated parts is shown in FIGS. 17A-17G. Instead of a wide base can with a diameter substantially the same a bottom tower piece, the wind turbine foundation 1000 has a narrower spool 1002 which preferably includes a metal cylindrical pipe including a top horizontal flange 1004A, a bottom horizontal flange 1004B, and a plurality of vertical flanges 1006. The top horizontal flange 1004A and the bottom horizontal flange 1004B preferably extend out from the spool 1002 from about 2 m to about 6 m. The spool height preferably ranges from about 2.5 m to about 5 m. A plurality of girders 1008 are connected to the spool 1002 preferably using bolts along the top horizontal flange 1004A, a bottom horizontal flange 1004B, and a plurality of vertical flanges 1006. The girders 1008 preferably have a length ranging from about 9 m to about 18 m and a maximum height ranging from about 2.5 m to about 5 m. The tower is mounted directly above the top of the girders themselves. The girders include upper girder flanges 1010A, lower girder flanges 1010B, and girder webs 1012. The upper girder flanges 1010A are connected to the top horizontal flange 1004A, the lower girder flanges 1010B are connected to the bottom horizontal flange 1004B, and the girder webs 1012 are connected to the vertical flanges 1006. As one example, the vertical flanges 1006 are preferably situated in pairs defining a plurality of slits 1014 wherein each pair includes a slit between each of the vertical flanges making up that particular pair of vertical flanges 1006. Portions of the girder webs 1012 along proximal ends 1016 of the girders are slid into the slits 1014 and the girder webs 1012 are connected to the pairs of vertical flanges 1006 preferably using bolts. The upper girder flanges 1010A along proximal ends 1016 of the girders 1008 are preferably tapered so that the girders 1008 can be connected to the spool 1002 in radial fashion as shown, for example, in FIG. 17C.

Figure 17A:
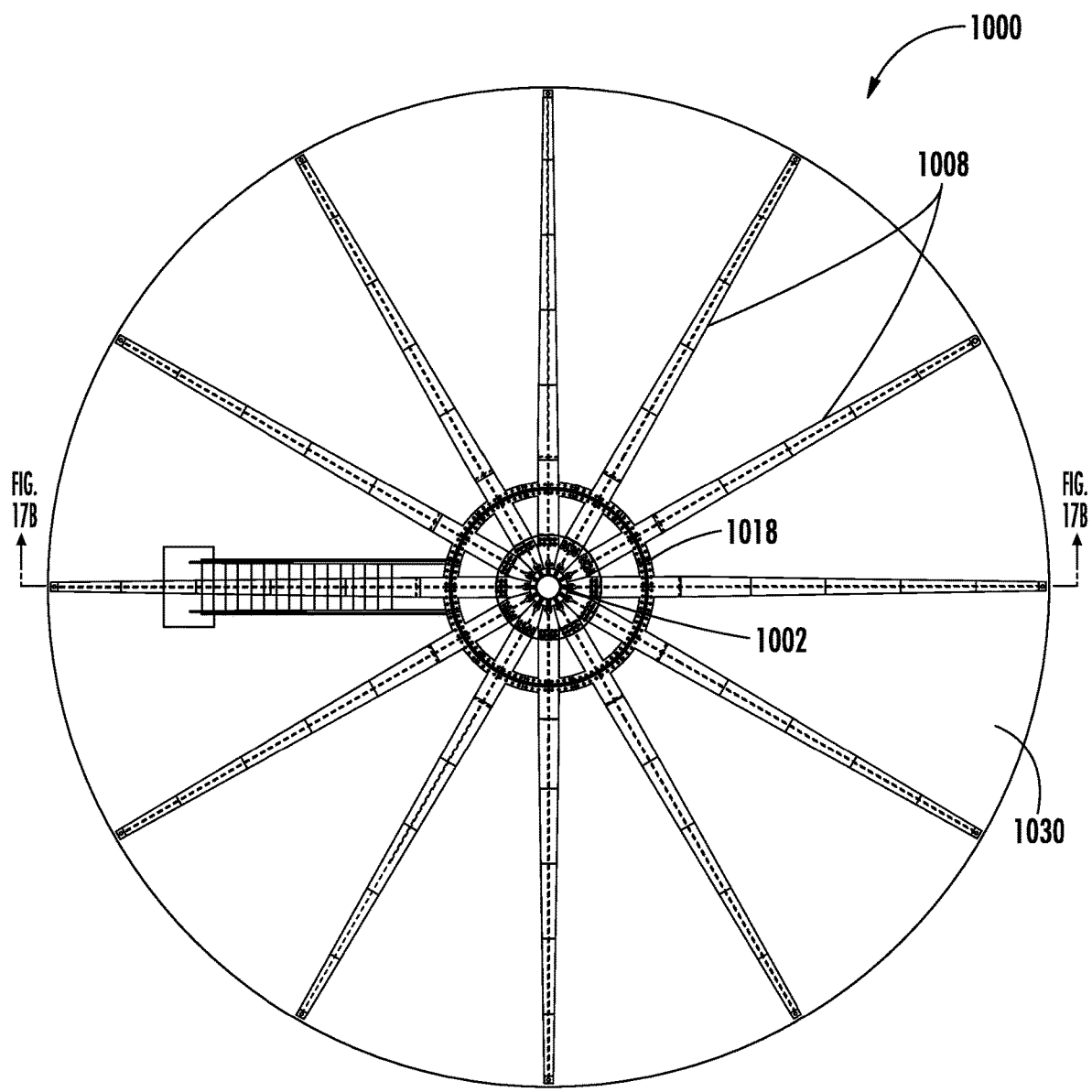
FIG. 17A shows a plan view of a wind turbine foundation including a spool and a plurality of girders connected to the spool.
Figure 17C:
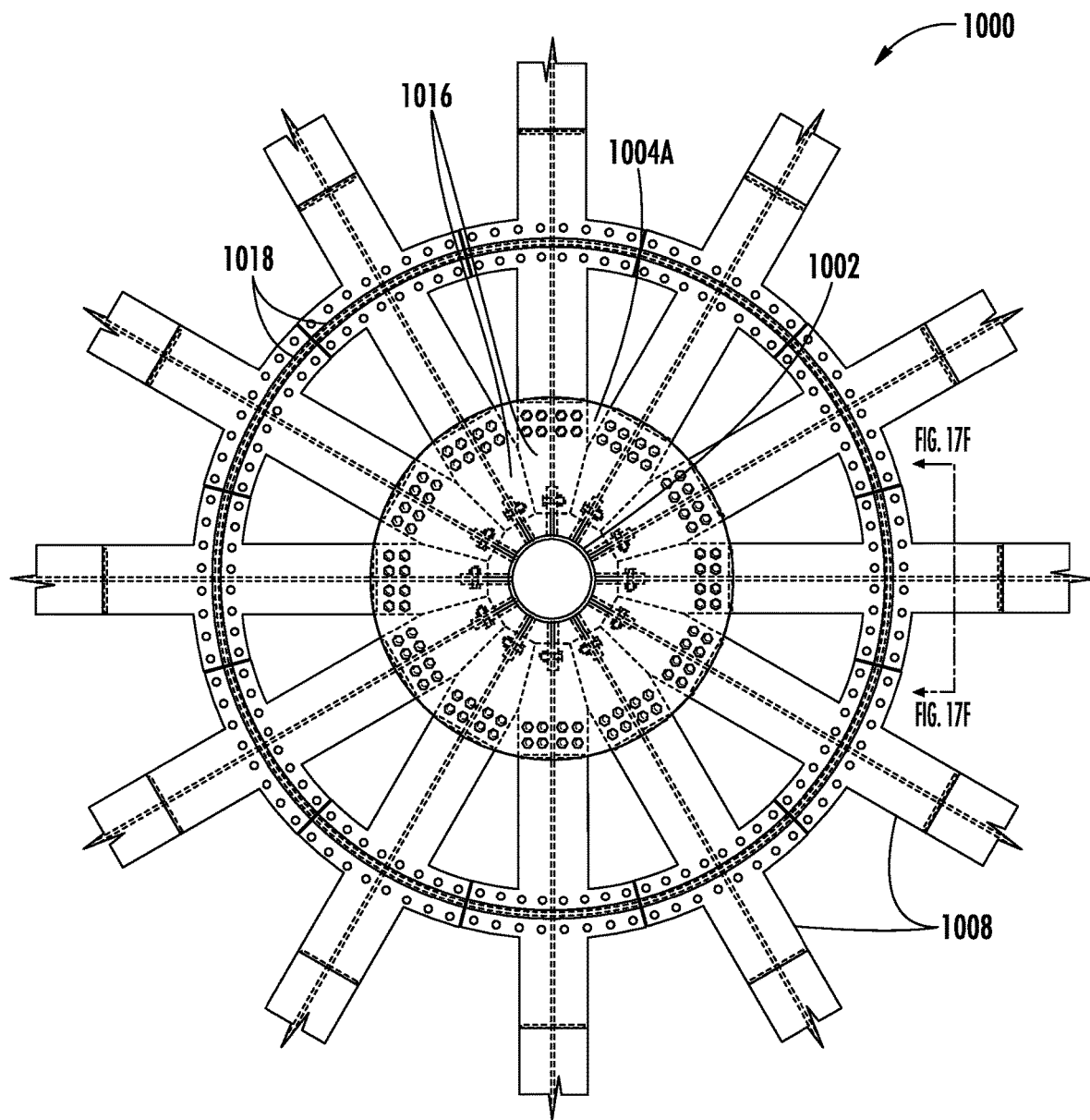
FIG. 17C shows a close-up partial plan view of the spool and the plurality of girders attached thereto from the wind turbine foundation shown in FIG. 17A.
Figure 17D:
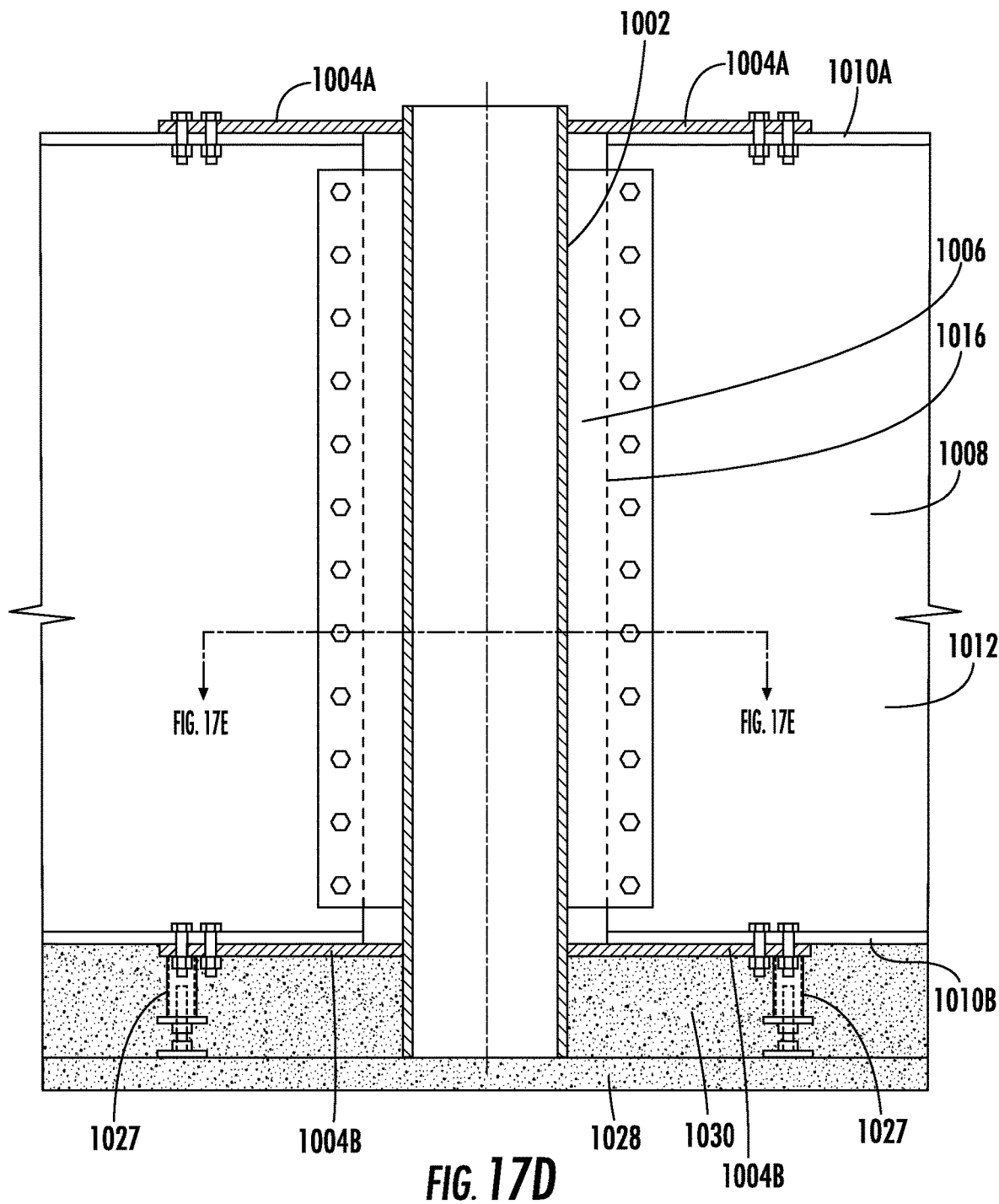
FIG. 17D shows a cut-away side partial view of the spool and girders from the wind turbine foundation shown in FIG. 17A.
Figure 17E:
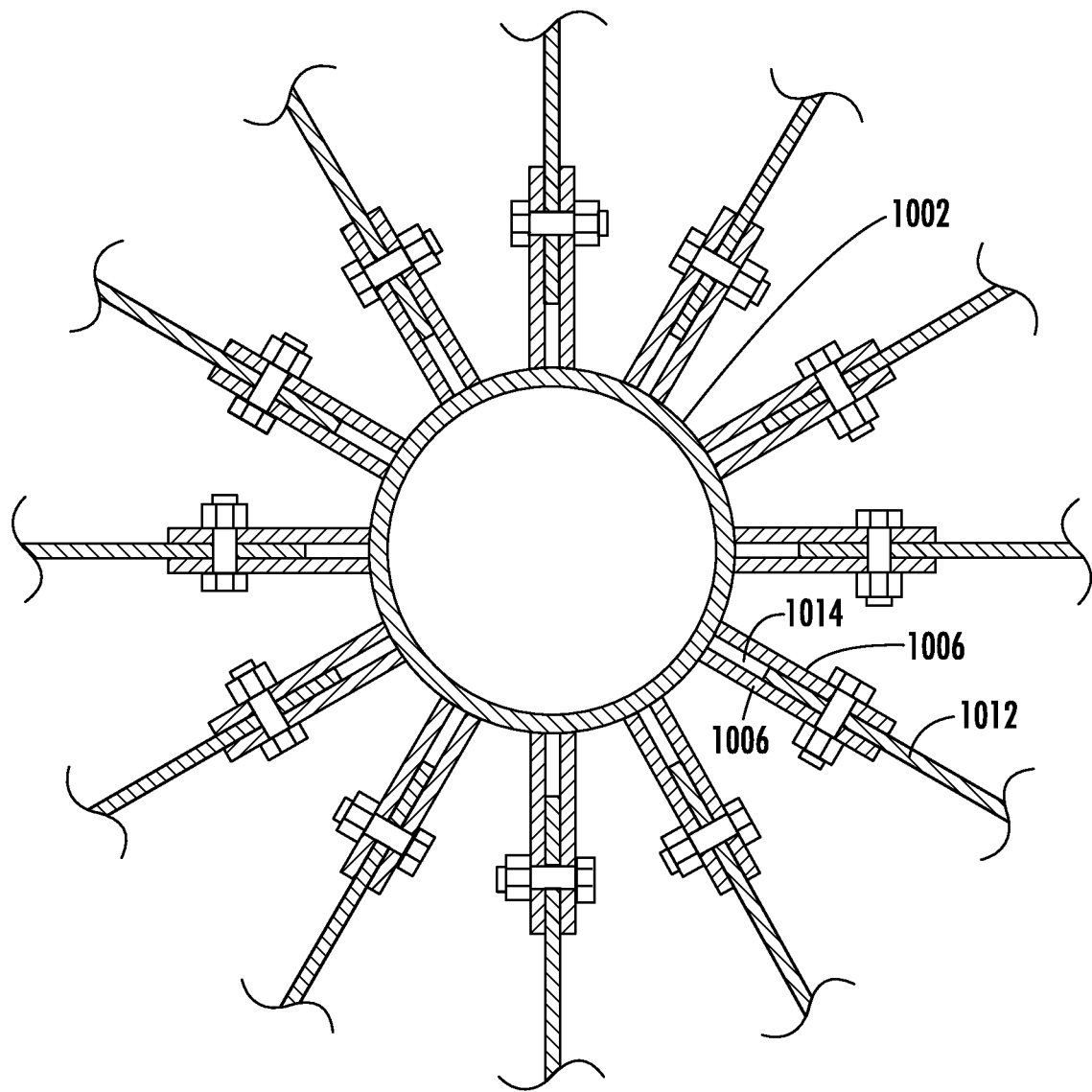
FIG. 17E shows a cut-away partial view looking down from the center of the spool as viewed from line "FIG. 17E" shown in FIG. 17D.
Figure 17F:
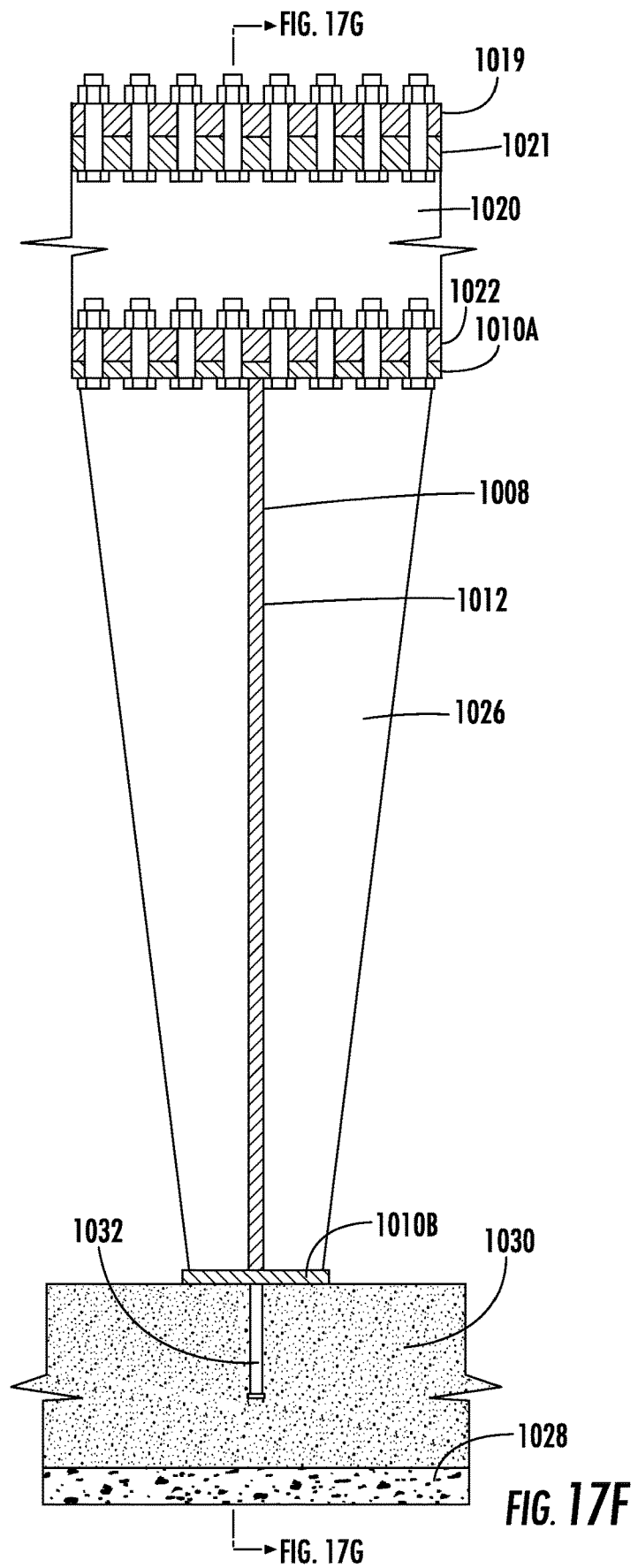
FIG. 17F shows a cut-away partial view looking down a girder toward the spool as shown from the view of line "17F" in FIG. 17C wherein a ring beam has been added to the apparatus from 17C and is bolted to the plurality of girders.
Figure 17G:
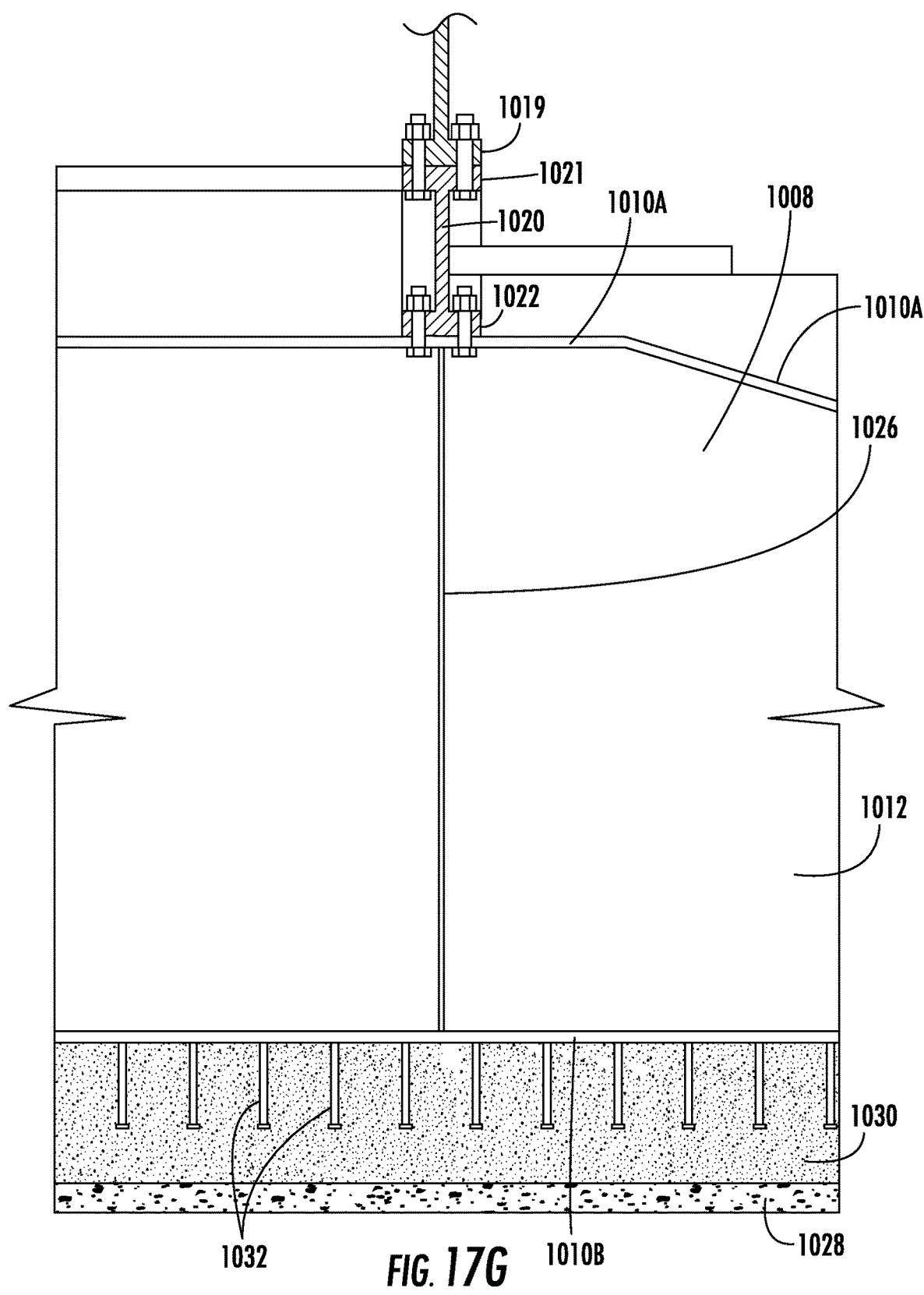
FIG. 17G shows a partial side view of a girder connected to a ring girder which is connected to a first tower piece of the wind turbine foundation shown in FIG. 17B.
Figure 17H:
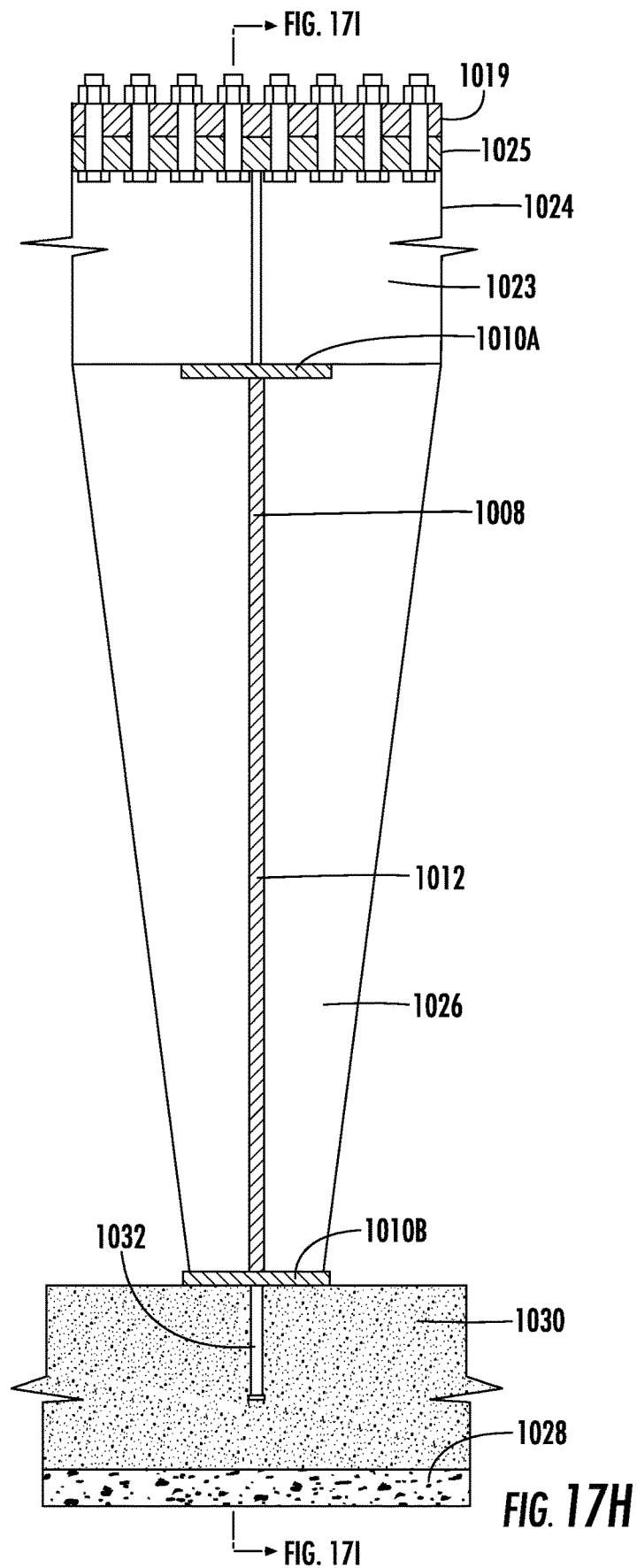
FIG. 17H shows a cut-away partial view looking down a girder toward the spool wherein a curved ring girder section has been added by welding to the girder shown in FIG. 17H.
Figure 17I:
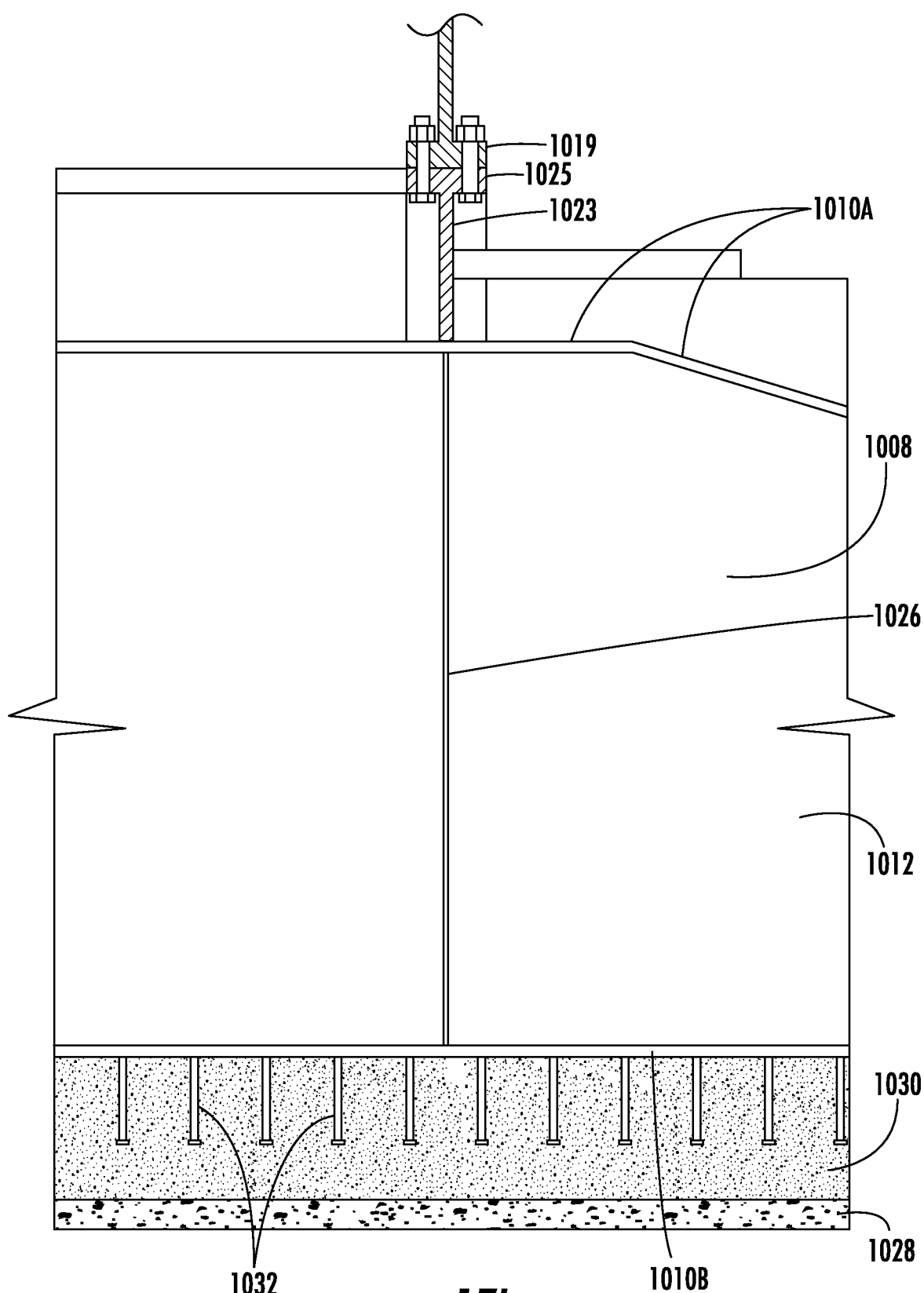
FIG. 17I shows a partial side view of a girder welded to a ring beam which is attached to a first tower piece of the wind turbine foundation.
Figure 17J:
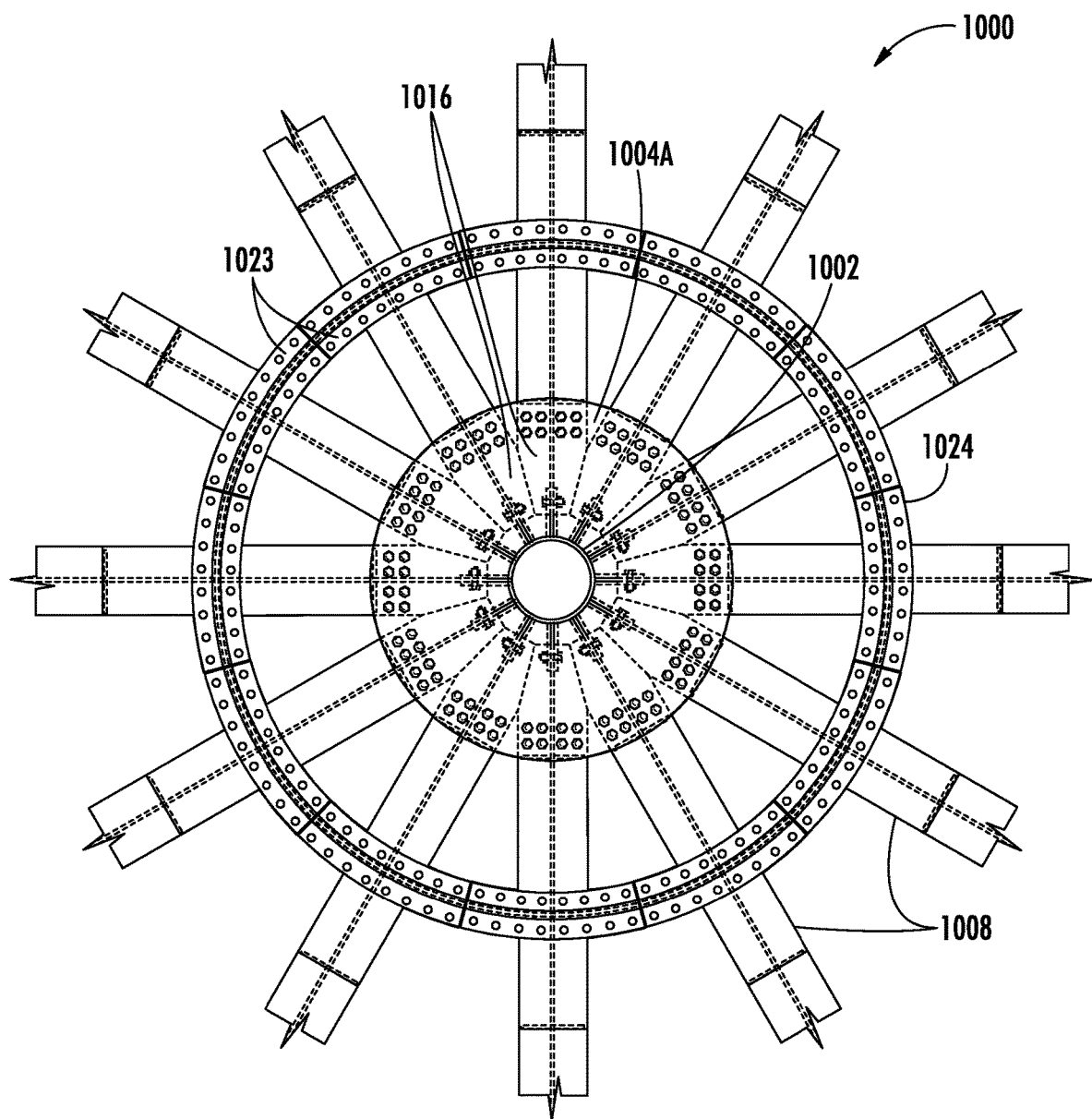
FIG. 17J shows a close-up partial plan view of the spool, the plurality of girders attached thereto from the wind turbine foundation shown in FIG. 17A and further shows a plurality of curved ring girder subsections connected to the girders and forming a composite ring girder.

The girders 1008 preferably include curved flanges 1018 which are preferably an extension of the upper girder flanges 1010A at a location along the girders 1008 above which a first tower piece 1019 would rest. The curved flanges 1018 together form a circle as shown, for example, in FIG. 17C. In one embodiment, a ring girder 1020 is placed above and connected to the curved flanges 1018 as shown, for example, in FIGS. 17B and 17F-17I. In this embodiment, the ring girder 1020—preferably a short cylinder of metal including an upper ring girder flange 1021 and a lower ring girder flange 1022—is bolted to the curved flanges 1018 along the lower ring girder flange 1022. The first tower piece 1019 is connected to the ring girder 1019 along the upper ring girder flange 1021. In an alternative embodiment shown in FIGS. 17H-17I, curved ring girder subsections 1023 are welded directly to the upper girder flanges 1010A instead of using the curved flanges 1018. In this alternate embodiment, there is preferably one ring girder subsection welded to each girder (one ring girder subsection per girder). When all girders 1008 are assembled in place (i.e., connected to the spool 1002), the curved ring girder subsections 1023 form a composite ring girder 1024 similar to the ring girder 1020. The curved ring girder subsections 1023 include upper ring girder subsection flanges 1025 for connection with the first tower piece 1019. FIG. 17J shows a plan view of the plurality of girders 1008 connected to the spool 1002 and including curved ring girder subsections 1023 connected to the radial girders 1008 to form the composite ring girder 1024 including the upper ring girder subsection flanges 1025 for connecting a tower piece to the composite ring girder 1024.

In these examples, the girders 1008 include tapered stiffener plates 1026. The stiffener plates 1026 are wide and are added to support the curved flange 1018 (if present), the ring girder 1020, and/or the composite ring girder 1024 and distribute the tower forces to the full girder 1008 height.

During installation, the spool 1002 and girders 1008 are supported by support legs 1027 including leveling bolts. The support legs 1027 rest on a mud slab 1028. A base layer 1030, preferably of reinforced concrete, is laid above the mud slab 1028, beneath the spool 1002 and girders 1008. The girders 1008 preferably include downward facing studs 1032 (e.g., Nelson™ studs) that are enmeshed with the base layer 1030 and that are sized and spaced to provide sufficient steel to limit the stress range to meet fatigue design requirements. The wind turbine foundation 1000 provides a stiffer direct connection between the tower piece 1019 and the radial girders 1008 with the center girder connection done in a lower stress location reducing bolting and plate thicknesses as well as lessening fatigue issues. This configuration also provides a more direct load flow along each radial girder 1008 set from the compression side to the tension side of the foundation 1000.

An example of a construction sequence for certain embodiments described herein is as follows:

1. Excavate foundation area (e.g., ~3 m×20 m diameter), verify in situ ground conditions and improve as per normal foundation preparation.
2. Pour concrete mud slab to protect the exposed ground and create a level work surface.
3. Install base slab reinforcing over entire area noting the pattern for foundation orientation.
4. Install base can or spool on support legs which include leveling bolts.
5. Install all radial girders by bolting to the base can or spool. Final levelling of the tower flange is conducted by adjustment of the levelling bolts on the girder ends and base can or spool perimeter. The perimeter levelling bolts are used to perform final levelling adjustments to the tower flange. The levelling bolts on the base can or spool are raised during this process and re-lowered once the final levelling is complete.

6. Pour the base slab concrete and screed to the top of the second outer flange (girder base flange) ensuring full concrete contact to underside of flange by watching the air bleed holes in the flanges.
7. Install electrical conduits and grounding cables.
8. Pour concrete fill in base can (if applicable) and trowel finish top surface.
9. Backfill foundation with excavated soil stockpiled adjacent to the area.
10. Grade area for drainage, install gravel surfacing and install precast stairs foundation.

In one specific nonlimiting example, the wind turbine foundation 100 is preferably housed in a hole dug in the ground with a preferred height of from about 2 meters to about 4 meters and diameter of from about 15 meters to about 25 meters for use with a 3.5 megawatt (MW) wind turbine. Although specific preferred dimensions are provided herein for an example of a foundation for use with a 3.5 MW wind turbine, it should be understood that the technology described herein can be scaled with different dimensions to accommodate different sized wind turbines. Digging the hole is a first step (A1) in building the wind turbine foundation 100. An additional step (B1) includes pouring an underlying mud slab 112 in the hole wherein, in this specific example, the underlying mud slab 112 is preferably from about 50 mm to about 200 mm thick. The base can 102 and girders 104 are preferably situated on the mud slab 112 that, in this specific example, is preferably round with a diameter of from about 15 meters to about 25 meters and most preferably about 20 meters. In this specific example, the girders 104 are preferably about 2 meters tall along the tallest edge of the girders 104 where the girders 104 attach to the base can 102, however other sizes are contemplated for different embodiments.

An additional step (C1) in making the wind turbine foundation 100 includes placing the base can 102 in the hole on the underlying mud slab 112. The base can 102 is preferably placed at the approximate center of the underlying mud slab 112. In this specific example, the base can 102 is preferably from about 2 meters to about 6 meters high and most preferably about 3.5 meters high. In this specific example, the base can 102 is preferably about 4 meters to about 6 meters in diameter and most preferably about 5 meters in diameter. The base can 102 preferably includes a collector port 172 through which electrical and potentially other connections can be made to a wind turbine resting on the wind turbine foundation 100.

An additional step (D1) includes placing rebar 114 in the hole along the underlying mud slab 112. The rebar 114 preferably has a diameter of about 20 mm, a linear mass density of about 2.4 Kg/m and a cross-sectional area of about 300 mm$^2$ but other rebar sizes may be used. In this specific example, the total weight of rebar used per wind turbine foundation should be from approximately 10,000 Kg to about 16,000 Kg and most preferably less than about 13,000 Kg.

Another step (E1) includes attaching the girders 104 to the base can 102 preferably using bolts. In a following step (F1), a base layer of concrete 116 is poured beneath the girders 104 and beneath the base can 102. In this specific example, preferably from about 100 m$^3$ to about 120 m$^3$ of concrete is used to form the base layer 116.

A next step (G1) includes placing a mass of material (e.g., backfill 128 from the excavation to dig the hole) above the base layer 116 and preferably up to the collector port 172. Another step (H1) includes installing a collector conduit bundle 174 preferably through a culvert.

Another step (I1) includes adding additional backfill to the hole and inside the base can 102. Preferably, the backfill is added to a consistent depth across the hole with a slight slope of from about 2% to about 5% away from an upper section 128A of the base can 102 that remains exposed. In another step (J1), additional rebar is added inside the base can 102. A following step (K1) includes pouring concrete into the base can 102 to form a base can slab 176 wherein, in this specific example, from about 1 m$^3$ to about 3 m$^3$ of concrete is used. Another step (L1) includes attaching the first tower piece 110 to the tower flange 108 along the upper section 128A of the base can 102. The first outer flange 106A extends out from a main body 178 of the base can 102 and is also located along the upper section 128A of the base can 102. The second outer flange extends out from the main body 178 of the base can 102 and is located along a lower section 128B of the base can 102. As an example, the first outer flange 106A and the second outer flange 106B may be welded to the main body 178 or may be formed as a part of the base can 102.

In an embodiment where the base can is replaced by a spool, the placement of the spool, the installation of rebar, the attachment of the girders to the spool, the pouring of the concrete base layer, the placing of the mass of material including installation of a collector conduit and additional backfilling of the spool follow similar steps as outlined above with the base can being replaced by the spool.

The previously described embodiments of the present disclosure have many advantages. As described in the Background section, current methods of making foundations for wind turbines of the 3.5 MW size typically use about 400 m$^3$ of concrete, 83,000 Kg of steel, require a 5 week build cycle, and, depending on the geographic location, can only be built for certain months out of the year. For example, in many parts of Canada, construction can only be best carried out for about 8 months out of the year. Some of the embodiments described herein relating to 3.5 MW turbines typically use about 140 m$^3$ of concrete and 70,000 Kg of steel. Some of these embodiments described herein have a three week build cycle, and can be built all twelve months of the year regardless of geography since many of the components including the girders can be made offsite during colder or otherwise inclement months. Current methods for making foundations for 3.5 MW wind turbines require on average about 80 truckloads of material. Some of the embodiments described herein relating to 3.5 MW turbines require approximately 20 truckloads of material since much of the ballast used is backfill from the initial excavation (which, therefore, does not need to be hauled away).

The various embodiments preferably use pre-fabricated structural steel components for efficient load transfer and distribution as part of the foundation. Such embodiments maximize use of natural in-situ materials (e.g., excavated soil) to provide stability. The embodiments described herein do not use a pre-tensioned anchor bolt cage embedded in concrete for transferring load from the tower to the foundation. Eliminating the anchor bolt cage eliminates a major construction step and makes rebar placement easier. A bolted flange connection eliminates the entire anchor cage typically consisting of about 180 4 m long×40 mm bolts and associated steel anchor rings. Embodiments described herein have a design type that is a raft foundation, like a traditional concrete raft foundation, however instead of concrete providing part of the bending and shear resistance and most of the ballast, the embodiments described herein use radial girders connected to a base can or spool for primary load transfer and use mostly backfill as ballast over the thin concrete base slab. The loads transferred to the girders are distributed into the proximal parts of the concrete slab. The slab is held in place by bearing on the subgrade below and the weight of the backfill on top of it. Similar to traditional concrete raft foundations, in medium to low strength soil conditions, the design is typically governed by rotational stiffness, depending on the turbine manufacturer requirement for stiffness. In stronger soils and on bedrock, the foundation size tends to be governed by overturning stability and sometimes bearing capacity.

New 4+MW wind turbines forces and diameters are causing design limits to be reached for traditional concrete raft foundations so an alternative to such foundations is becoming more necessary. High shear, rebar spacing issues and high-strength concrete are now common. Site conditions are dictating multiple traditional foundation solutions that increase cost and logistical challenges. For example, high groundwater and shallow weak bedrock are often found. One foundation type—a universal solution—is better than two or three different foundation types on one site from an economies-of-scale and simplicity-of-construction perspective. Pre-fabricated foundations offer year-round construction opportunity which decreases build time and reduces constraints. Shop manufactured components can be built and shipped any time of the year. In embodiments described herein, the tower to foundation joint is a bolted steel flange connection instead of a grouted base and anchor bolt connection. As turbine sizes increase, grouted connections are now reaching their maximum capacity. Bolted steel flanges offer much higher capacity that are in concert with the other tower connections above and have much better fatigue performance.

The foregoing description of preferred embodiments of the present disclosure has been presented for purposes of illustration and description. The described preferred embodiments are not intended to be exhaustive or to limit the scope of the disclosure to the precise form(s) disclosed. Different features of some embodiments can be substituted for other features of other embodiments to arrive at different embodiments of the concepts described herein. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A wind turbine foundation comprising:
   a. a metal base can further comprising:
      i. a substantially cylindrically-shaped main body,
      ii. a first outer flange extending out from the main body along an upper section of the base can,
      iii. a second outer flange extending out from the main body along a lower section of the base can, and
      iv. a tower flange including a plurality of apertures for attaching a wind turbine tower to the base can; and
   b. a plurality of metal radial girders connected to and radiating out from the base can wherein each of the plurality of radial girders are connected to the first outer flange and the second outer flange and wherein no concrete is required between the metal girders to support the wind turbine foundation.

2. The plurality of radial girders of claim 1 wherein each of the plurality of radial girders comprises an upper girder flange and a lower girder flange and wherein each upper girder flange is connected to the first outer flange and each lower girder flange is connected to the second outer flange.

3. The wind turbine foundation of claim 2 wherein at least a first portion of the upper girder flanges are substantially parallel with a portion of the lower girder flanges.

4. The wind turbine foundation of claim 2 wherein the first portion of the upper girder flanges comprises most of the upper girder flanges.

5. The wind turbine foundation of claim 1 wherein the wind turbine foundation is located in an excavated hole in the ground, wherein the hole in the ground is created by removing soil, and wherein at least some of the removed soil is laid over at least a portion of the plurality of metal girders.

6. The wind turbine foundation of claim 5 further comprising an underlying slab and a layer of rebar located above the underlying slab.

7. The wind turbine foundation of claim 6 further comprising a base layer of concrete poured along the underlying slab and the layer of rebar.

8. The wind turbine foundation of claim 1 further comprising an inner shell of concrete lining an inside surface of the base can.

9. The wind turbine foundation of claim 1 further comprising concrete substantially filling the base can.

10. The wind turbine foundation of claim 1 further comprising a plurality of first transverse girders wherein individual members of the plurality of first transverse girders are located between and connected to pairs of the plurality of radial girders.

11. The wind turbine foundation of claim 10 further comprising a plurality of second transverse girders wherein individual members of the plurality of second transverse girders are located between and connected to pairs of the plurality of girders at distal ends of the radial girders.

12. The wind turbine foundation of claim 1 wherein the plurality of radial girders comprises a plurality of truss girders.

13. The wind turbine foundation of claim 1 further comprising a plurality of piles supporting the plurality of radial girders at distal ends of the plurality of radial girders.

14. The wind turbine foundation of claim 1 further comprising a core column inside the base can and a plurality of stiffener plates connected to and radiating out from the core column wherein distal edges of the stiffener plates are connected to an interior surface of the base can.

15. The wind turbine foundation of claim 14 further comprising a first plurality of rock anchors connected to the plurality of radial girders wherein there is at least one rock anchor per radial girder extending into bedrock.

16. The wind turbine foundation of claim 15 further comprising a plurality of transverse girders wherein individual members of the plurality of transverse girders are located between and connected to pairs of the plurality of radial girders.

17. The wind turbine foundation of claim 16 further comprising a second plurality of rock anchors connected to the plurality of transverse girders wherein there is at least one rock anchor per transverse girder extending into bedrock.

18. The wind turbine foundation of claim 14 wherein the base can further comprises a plurality of vertical flanges wherein individual vertical flanges of the plurality of vertical flanges are connected to individual radial girders of the plurality of radial girders.

\* \* \* \* \*